(12) United States Patent
Li et al.

(10) Patent No.: US 12,671,559 B2
(45) Date of Patent: Jun. 30, 2026

(54) RANDOM ACCESS METHOD AND APPARATUS, TERMINAL AND STORAGE MEDIUM

(71) Applicant: VIVO MOBILE COMMUNICATION CO., LTD., Dongguan (CN)

(72) Inventors: Ping Li, Dongguan (CN); Gen Li, Dongguan (CN); Qi Hong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 310 days.

(21) Appl. No.: 18/244,217

(22) Filed: Sep. 9, 2023

(65) Prior Publication Data

US 2023/0421338 A1     Dec. 28, 2023

Related U.S. Application Data

(63) Continuation of application No. PCT/CN2022/079540, filed on Mar. 7, 2022.

(30) Foreign Application Priority Data

Mar. 9, 2021   (CN) .......................... 202110258609.9

(51) Int. Cl.
*H04L 5/00* (2006.01)
*H04W 72/044* (2023.01)
(Continued)

(52) U.S. Cl.
CPC ......... *H04L 5/0094* (2013.01); *H04W 72/044* (2013.01); *H04W 74/006* (2013.01); *H04W 74/0833* (2013.01)

(58) Field of Classification Search
CPC ............. H04W 74/006; H04W 72/044; H04W 74/0833; H04L 5/0048; H04L 5/0094;
(Continued)

(56) References Cited

U.S. PATENT DOCUMENTS 12,048,002 B2 * 7/2024 Thangarasa ........... H04W 74/08
12,166,715 B2 * 12/2024 Lin ........................ H04L 5/0051
(Continued)

FOREIGN PATENT DOCUMENTS

CN       109803445 A      5/2019
CN       110167164 A      8/2019
(Continued)

OTHER PUBLICATIONS

"3rd Generation Partnership Project; Technical Specification Group Radio Access Network; NR; Medium Access Control (MAC) protocol specification (Release 16)" 3GPP Standard; Technical Specification; 3GPP TS 38.321, vol. RAN WG2, No. V16.3.0 Jan. 6, 2021 (Jan. 6, 2021) (Year: 2021).*
(Continued)

*Primary Examiner* — Mehmood B. Khan
(74) *Attorney, Agent, or Firm* — IPX PLLC

(57) ABSTRACT

The application discloses a random access method and apparatus, a terminal, and a storage medium. The method includes: determining, by a terminal, a random access occasion (RO) time domain position group; and selecting a first RO from the RO time domain position group and calculating a random access radio network temporary identifier (RA-RNTI) of the first RO. The RO time domain position group includes at least one of the following: a transmittable frame number group and a first slot number group, or a second slot number group.

20 Claims, 16 Drawing Sheets

A terminal determines a random access occasion RO time domain position group — 300

Select a first RO from the RO time domain position group, and calculate a random access radio network temporary identifier RA-RNTI of the first RO — 301

(51) Int. Cl.
*H04W 74/00* (2009.01)
*H04W 74/0833* (2024.01)
(58) Field of Classification Search
CPC ... H04L 5/0082; H04L 5/0064; H04L 5/0092;
H04L 27/26; H04L 5/0016
See application file for complete search history.

(56) References Cited

U.S. PATENT DOCUMENTS

| | | | | |
|---|---|---|---|---|
| 2011/0013542 | A1* | 1/2011 | Yu | H04W 74/0838 |
| | | | | 370/280 |
| 2022/0149911 | A1* | 5/2022 | Li | H04L 5/0053 |
| 2022/0225422 | A1* | 7/2022 | Kundu | H04W 16/14 |
| 2022/0317241 | A1* | 10/2022 | Aduru | H04W 16/14 |
| 2023/0156704 | A1* | 5/2023 | Wang | H04L 1/1861 |
| | | | | 370/329 |
| 2024/0073752 | A1* | 2/2024 | Da Silva | H04W 36/00698 |
| 2024/0314651 | A1* | 9/2024 | Kim | H04W 36/0072 |

FOREIGN PATENT DOCUMENTS

| | | | | |
|---|---|---|---|---|
| CN | 110876205 A | 3/2020 | | |
| CN | 113811016 A | 12/2021 | | |
| WO | WO-2018203673 A1 * | 11/2018 | | H04W 74/006 |
| WO | 2020167083 A1 | 8/2020 | | |

OTHER PUBLICATIONS

"3rd Generation Partnership Project; Technical Specification Group Radio Access Network; NR; Physical channels and modulation (Release 16)" 3GPP Standard; Technical Specification; 3GPP TS 38.211, vol. RAN WG1, No. V16.3.0 Oct. 1, 2020 (Oct. 1, 2020) (Year: 2020).*
Extended European Search Report issued in related European Application No. 22766268.1, mailed Jul. 25, 2024, 10 pages.
"3rd Generation Partnership Project; Technical Specification Group Radio Access Network; NR; Medium Access Control (MAC) protocol specification (Release 16)", 3GPP Standard; Technical Specification; 3GPP TS 38.321, 3RC Generation Partnership Project (3GPP), Mobile Competence Centre ; 650, Route Des Lucioles ; F-06921 Sophia-Antipolis Cedex ; France, vol. RAN WG2, No. V16.3.0 Jan. 6, 2021, pp. 1-156, XP051999701.
"3rd Generation Partnership Project; Technical Specification Group Radio Access Network; NR; Physical channels and modulation (Release 16)", 3GPP Standard; Technical Specification; 3GPP TS 38.211, 3RC Generation Partnership Project (3GPP), Mobile Competence Centre ; 650, Route Des Lucioles ; F-06921 Sophia-Antipolis Cedex ; France, vol. RAN WG1, No. V16.3.0 Oct. 1, 2020, pp. 1-133, XP051961275.
International Search Report issued in corresponding International Application No. PCT/CN2022/079540, mailed May 20, 2022, 6 pages.
Qualcomm Incorporated, "Initial Access Aspects for NR from 52.6GHz to 71 GHz", 3GPP tsg_ran\wg1_rl1 R1-2110173, Oct. 2021, 10 pages.
Qualcomm Incorporated, "Initial Access Aspects for NR from 52.6GHz to 71 GHz", 3GPP tsg_ran\wg1_rl1 R1-2101453, Jan. 2021, 14 pages.

* cited by examiner

300

A terminal determines a random access occasion RO time domain position group

Select a first RO from the RO time domain position group, and calculate a random access radio network temporary identifier RA-RNTI of the first RO

301

A 60kHz first slot

| 0 | 1 | 2 | 3 | 4 | 5 | 6 | 7 |

| 0 | ... | 79 | 80 | ... | 159 | 160 | ... | 239 | 240 | ... | 319 |
|---|-----|----|----|-----|-----|-----|-----|-----|-----|-----|-----|
| ID of a group | 0 | | 1 | | | 2 | | | 3 | | |

| 0 | 1 | 2 | 3 | 4 | 5 | 6 | 7 | ... | 317 | 318 | 319 |
|---|---|---|---|---|---|---|---|-----|-----|-----|-----|
| ID of a group | 0 | 1 | 2 | 3 | 0 | 1 | 2 | 3 | | ... | |

| 0 | 1 | 2 | 3 | ... | ... | 37 | 38 | 39 |
|---|---|---|---|-----|-----|----|----|----|

A 60kHz first slot

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|

| 4 | ... | 7 | 12 | ... | 159 | 164 | ... | 167 | 172 | ... | 319 | 324 | ... | 327 | 332 | ... | 479 | 484 | ... | 487 | 492 | ... | 639 |
|---|-----|---|----|-----|-----|-----|-----|-----|-----|-----|-----|-----|-----|-----|-----|-----|-----|-----|-----|-----|-----|-----|-----|

ID of a group

| 0 | | | | 1 | | | | 2 | | | | 3 | |

FIG. 43

| 4 | 5 | 7 | 7 | 11 | 12 | 13 | 14 | 15 | 20 | 21 | 22 | 23 | 28 | 29 | 30 | 31 | 36 | 37 | ... | 636 | 637 | 638 | 639 |
|---|---|---|---|----|----|----|----|----|----|----|----|----|----|----|----|----|----|----|-----|-----|-----|-----|-----|

ID of a group

| 0 | 1 | 2 | 3 | 0 | 1 | 2 | 3 | 0 | 1 | 2 | 3 | 0 | 1 | 2 | 3 | 0 | 1 | 2 | 3 |

FIG. 44

RANDOM ACCESS METHOD AND APPARATUS, TERMINAL AND STORAGE MEDIUM

CROSS-REFERENCE TO RELATED APPLICATIONS

This application is a continuation of International Application No. PCT/CN2022/079540, filed Mar. 7, 2022, which claims priority to Chinese Patent Application No. 202110258609.9, filed Mar. 9, 2021. The entire contents of each of the above-referenced applications are expressly incorporated herein by reference.

TECHNICAL FIELD

This application relates to the technical field of communications, and in particular relates to a random access method and apparatus, a terminal, and a storage medium.

BACKGROUND

In the existing communications system, the Physical Random Access Channel (PRACH) is used to transmit the preamble, and each PRACH occasion (RO) can only transmit one preamble, but more UEs can use the same RO to transmit different preambles.

In the B52.6 GHz system, a high PRACH sub-carrier spacing (SCS), such as 480/960 KHz, may be supported. The PRACH SCS supported by the RO time-frequency resource configuration of the current protocol is 15/30/60/120 KHz. When the SCS is greater than 120 kHz, even if the subcarrier spacing of a reference slot of FR2 60 kHz is used, the number of PRACH slots in one reference slot exceeds 2, but the number of PRACH slots in a reference slot in the existing configuration table (Number of PRACH slots within 60 kHz slot) can only be 1 or 2, and cannot be applied to a higher subcarrier spacing.

Therefore, when the subcarrier spacing of the PRACH supported by the system is greater than 120 kHz, how to configure RO time-frequency resources needs to be solved.

SUMMARY

Embodiments of this application provide a random access method and apparatus, a terminal, and a storage medium.

According to a first aspect, a random access method is provided, and the method includes:

determining, by a terminal, a random access occasion RO time domain position group; and selecting a first RO from the RO time domain position group, and calculating a random access radio network temporary identifier RA-RNTI of the first RO;

where the RO time domain position group includes at least one of the following:

a transmittable frame number group and a first slot number group, and a second slot number group;

where the transmittable frame number group is used to indicate a transmittable frame, and the transmittable frame is a radio frame where an RO that can be used to transmit a preamble is located;

the first slot number group is used to indicate a first slot that is based on a first subcarrier spacing and in which the RO is located in the transmittable frame; or the second slot number group is used to indicate a second slot that is based on a second subcarrier spacing and in which the RO is located in the first slot.

According to a second aspect, a random access apparatus is provided, including:

a determining unit, configured to determine a random access occasion RO time domain position group; and a calculation unit, configured to select a first RO from the RO time domain position group, and calculate a random access radio network temporary identifier RA-RNTI of the first RO;

where the RO time domain position group includes at least one of the following:

a transmittable frame number group and a first slot number group, and a second slot number group;

where the transmittable frame number group is used to indicate a transmittable frame, and the transmittable frame is a radio frame where an RO that can be used to transmit a preamble is located;

the first slot number group is used to indicate a first slot that is based on a first subcarrier spacing and in which the RO is located in the transmittable frame; or the second slot number group is used to indicate a second slot that is based on a second subcarrier spacing and in which the RO is located in the first slot.

According to a third aspect, a terminal is provided, where the terminal includes a processor, a memory, and a program or an instruction stored in the memory and executable on the processor, where when the program or instruction is executed by the processor, steps of the method according to the first aspect are implemented.

According to a fourth aspect, a readable storage medium is provided. The readable storage medium stores a program or an instruction, and the program or the instruction is executed by a processor to implement the steps of the method according to the first aspect.

According to a fifth aspect, a chip is provided, where the chip includes a processor and a communications interface, the communications interface is coupled to the processor, and the processor is configured to run a program or an instruction to implement the method according to the first aspect.

According to a sixth aspect, a computer program product is provided, the program product is stored in a readable storage medium, and when the program product is executed by at least one processor, the method according to the first aspect is implemented. In the embodiments of this application, the terminal determines the random access timing RO time domain position group, where the RO time domain position group includes at least one of the following: a transmittable frame number group and a first slot number group; or a second slot number group, and then the terminal selects an RO from the RO time domain position group, and calculates the random access radio network temporary identifier RA-RNTI of the RO, which can configure RO time-frequency resources when the subcarrier spacing of the PRACH supported by the system is greater than 120 kHz.

3

Figures 2, 3:
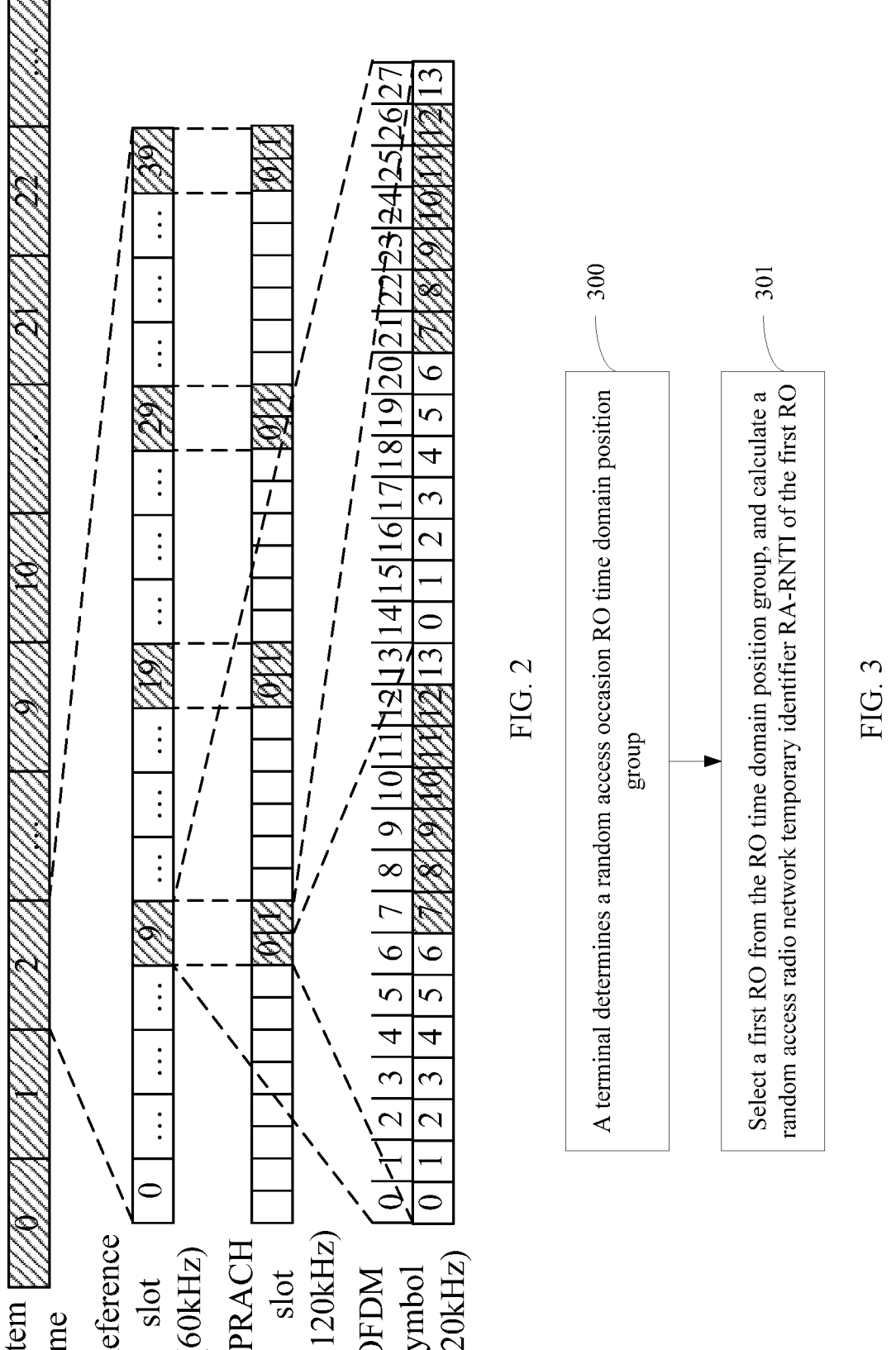
FIG. 2 is a schematic diagram of RO time domain resource configuration when a PRACH SCS is 120 kHz in a case of FR2.
Figures 4, 5, 6:
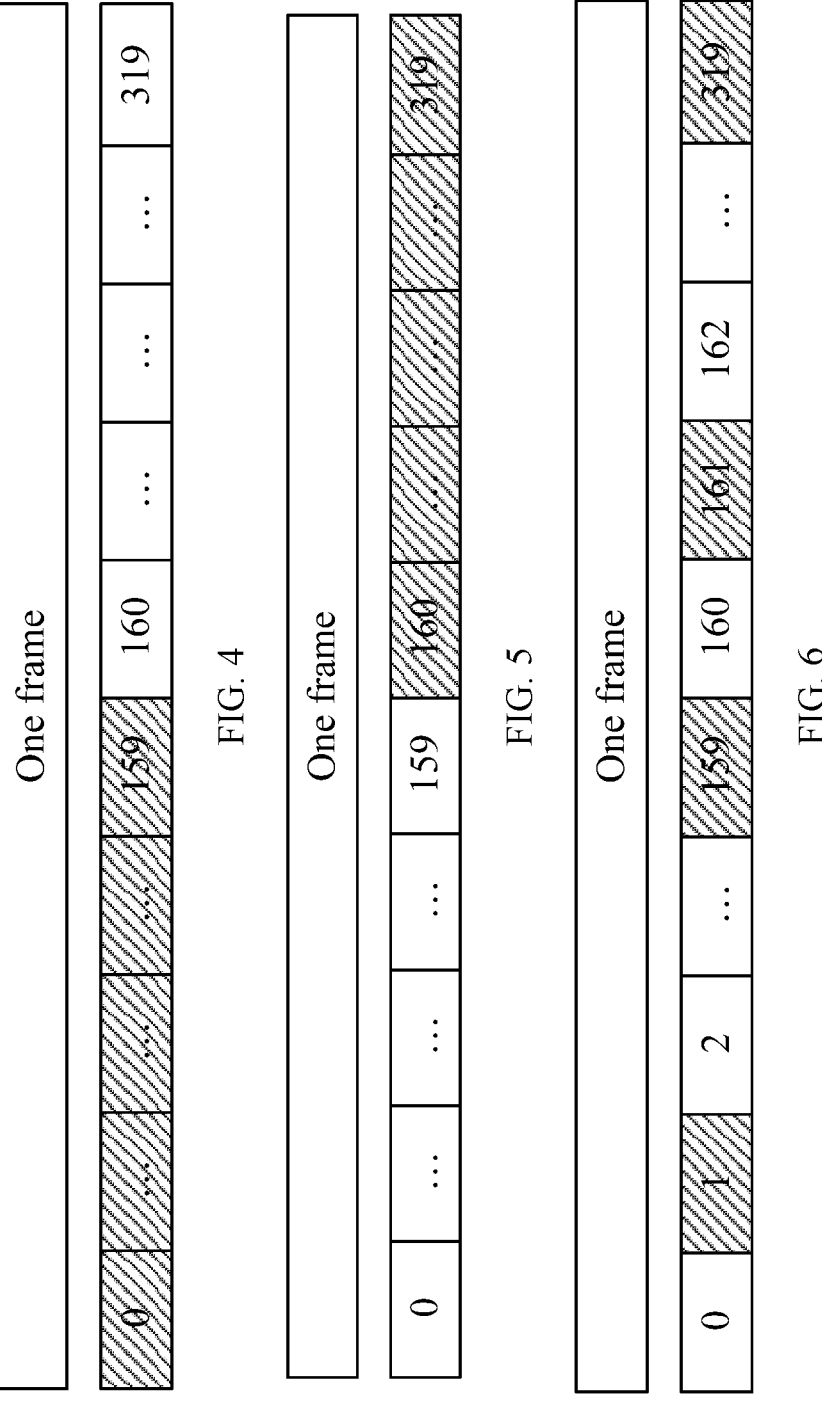
Figures 7, 8, 9:
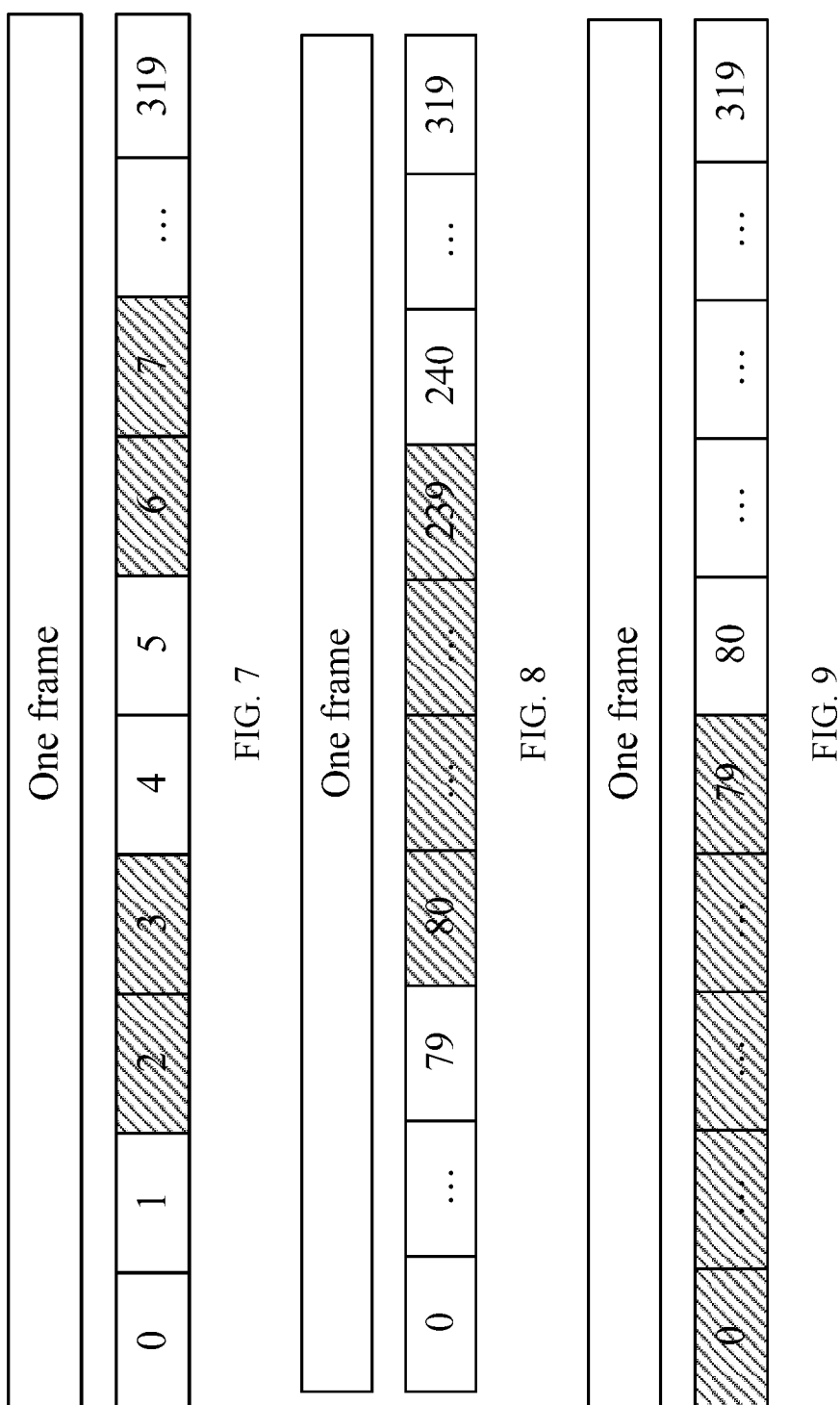
Figures 10, 11, 12:
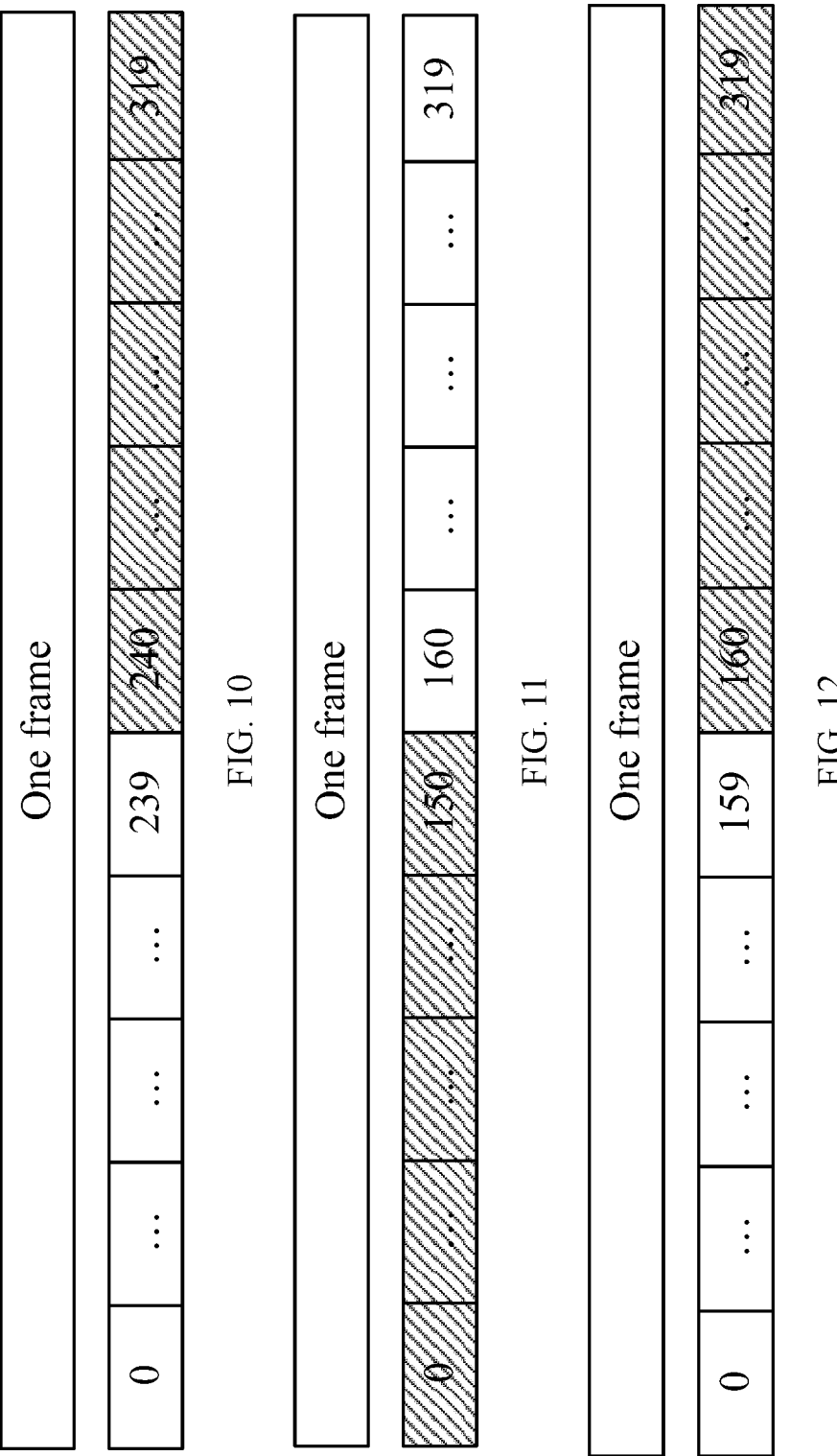
Figures 13, 14, 15, 16:
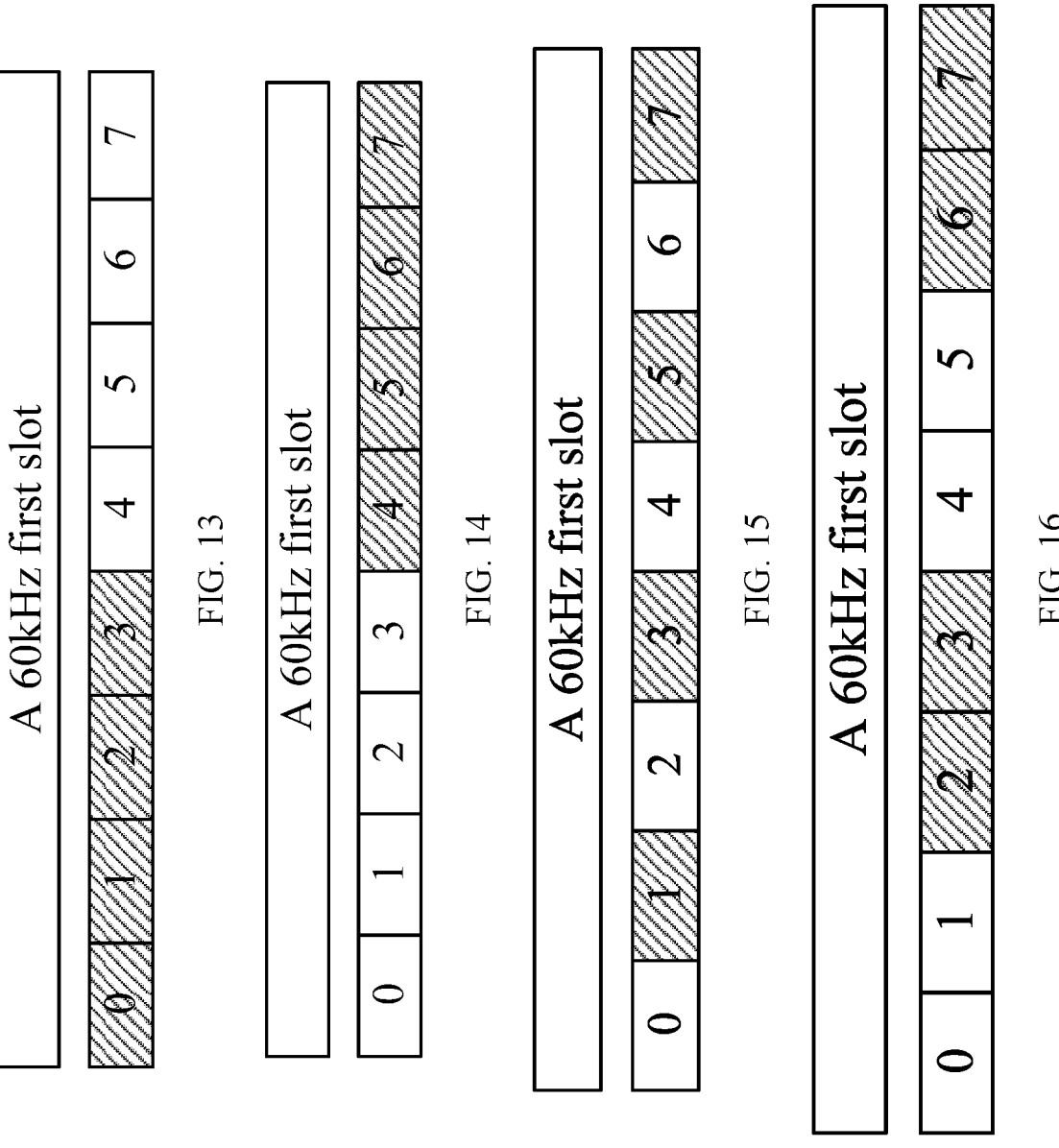
Figures 17, 18, 19:
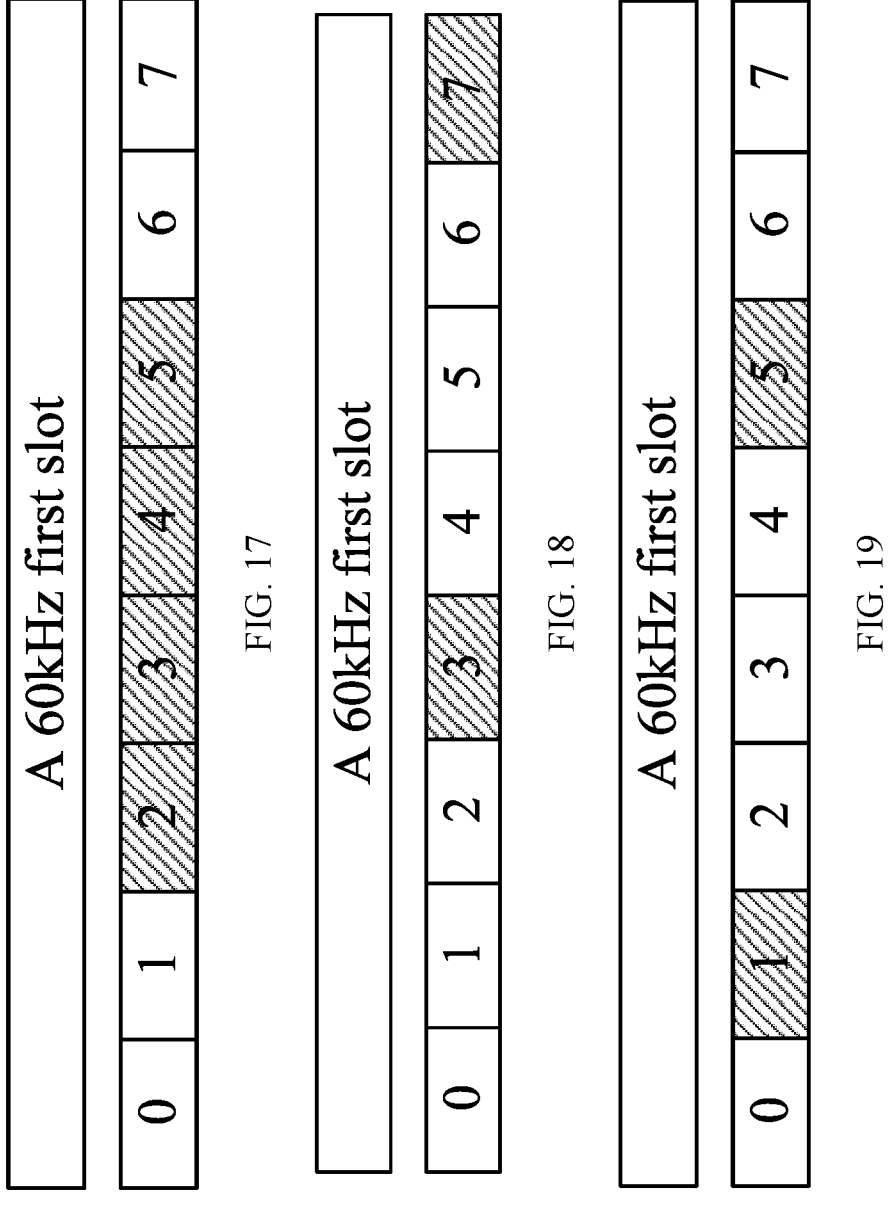
Figures 20, 21, 22:
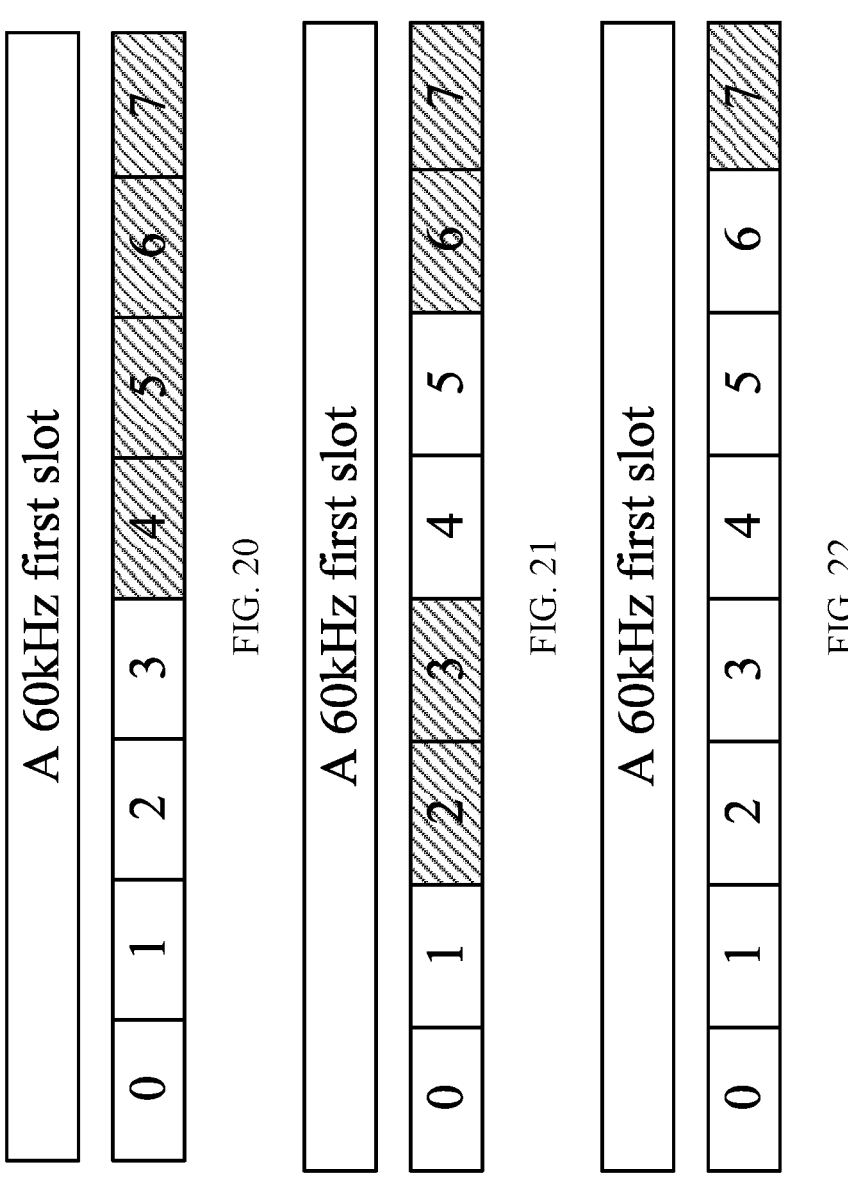
Figures 23, 24, 25:
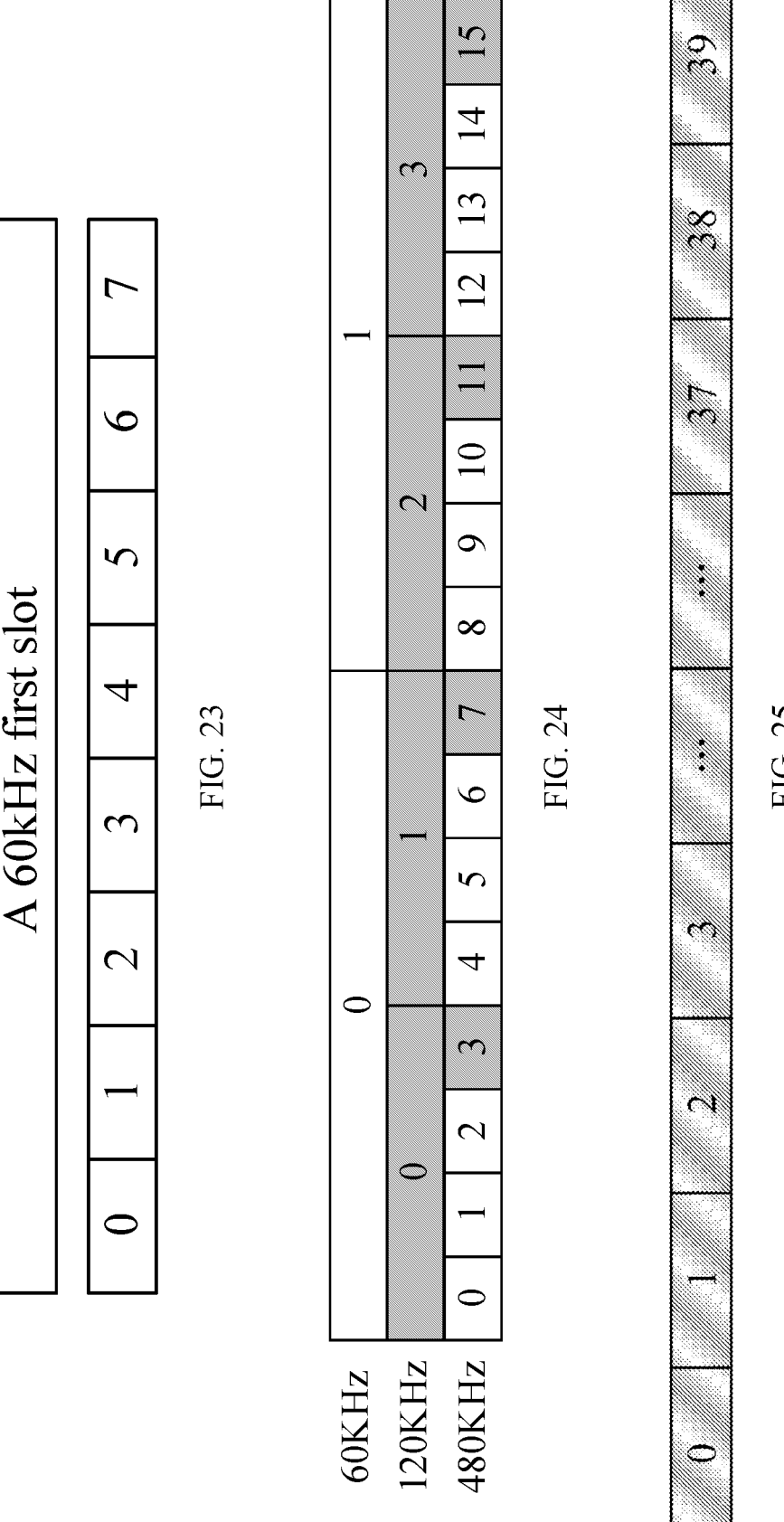
Figures 26, 27, 28:
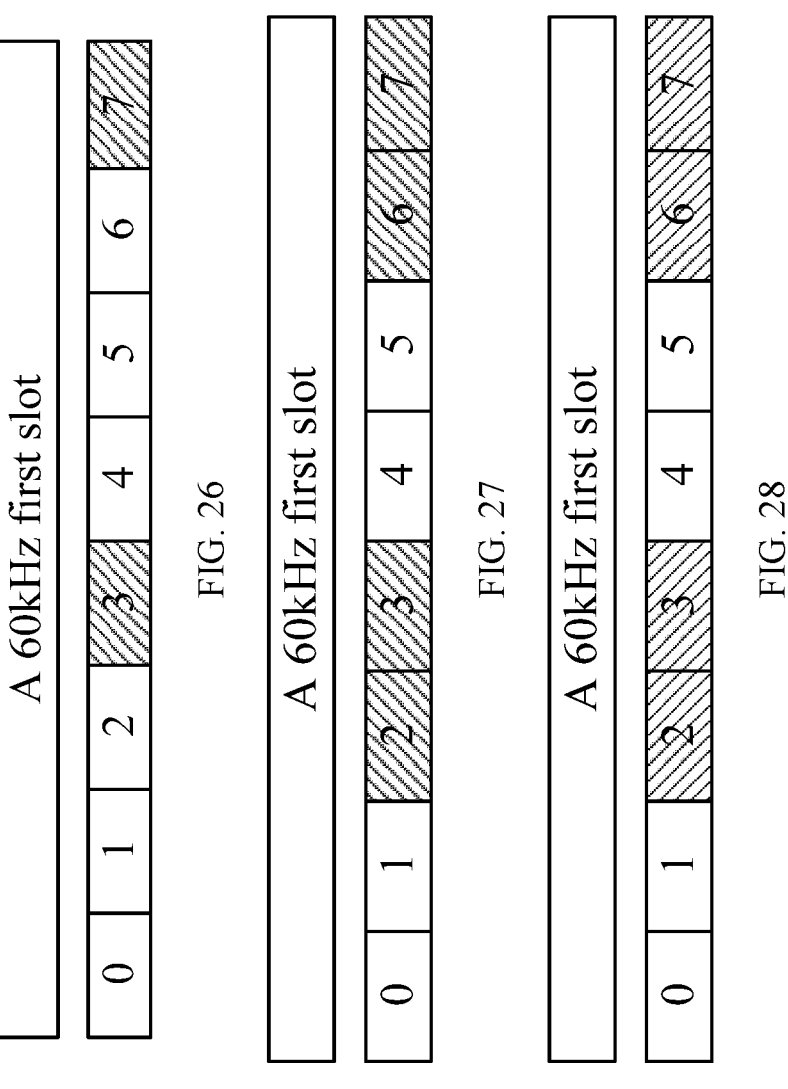

FIG. 3 is a flowchart of a random access method according to an embodiment of this application;

FIG. 4 is a schematic diagram 1 of M1 values of a first slot number group according to an embodiment of this application;

FIG. 5 is a schematic diagram 2 of M1 values of a first slot number group according to an embodiment of this application;

FIG. 6 is a schematic diagram 3 of M1 values of a first slot number group according to an embodiment of this application;

FIG. 7 is a schematic diagram 4 of M1 values of a first slot number group according to an embodiment of this application;

FIG. 8 is a schematic diagram 5 of M1 values of a first slot number group according to an embodiment of this application;

FIG. 9 is a schematic diagram of a first slot number group when M1=80 and candidate k1=0 according to an embodiment of this application;

FIG. 10 is a schematic diagram of a first slot number group when M1=80 and candidate k1=1 according to an embodiment of this application;

FIG. 11 is a schematic diagram of a first slot number group when M1=160 and candidate k1=0 according to an embodiment of this application;

FIG. 12 is a schematic diagram of a first slot number group when M1=160 and candidate k1=1 according to an embodiment of this application;

FIG. 13 is a schematic diagram 1 of a second slot number group according to an embodiment of this application;

FIG. 14 is a schematic diagram 2 of a second slot number group according to an embodiment of this application;

FIG. 15 is a schematic diagram 3 of a second slot number group according to an embodiment of this application;

FIG. 16 is a schematic diagram 4 of a second slot number group according to an embodiment of this application;

FIG. 17 is a schematic diagram 5 of a second slot number group according to an embodiment of this application;

FIG. 18 is a schematic diagram of a second slot number group when M2=2 and candidate k2=0 according to an embodiment of this application;

FIG. 19 is a schematic diagram of a second slot number group when M2=2 and candidate k2=1 according to an embodiment of this application;

FIG. 20 is a schematic diagram of a second slot number group when M2=4 and candidate k2=0 according to an embodiment of this application;

FIG. 21 is a schematic diagram of a second slot number group when M2=4 and candidate k2=1 according to an embodiment of this application;

FIG. 22 is a schematic diagram of a second slot number group when M2=1 according to an embodiment of this application;

FIG. 23 is a schematic diagram of a second slot number group when M2=2 according to an embodiment of this application;

FIG. 24 is a schematic diagram of a time domain number t_id according to an embodiment of this application;

FIG. 25 is a schematic diagram 1 of a first slot set according to an embodiment of this application;

FIG. 26 is a schematic diagram 6 of a second slot number group according to an embodiment of this application;

FIG. 27 is a schematic diagram 7 of a second slot number group according to an embodiment of this application;

FIG. 28 is a schematic diagram 1 of a second slot set according to an embodiment of this application;

4

Figures 29, 30, 31, 32:
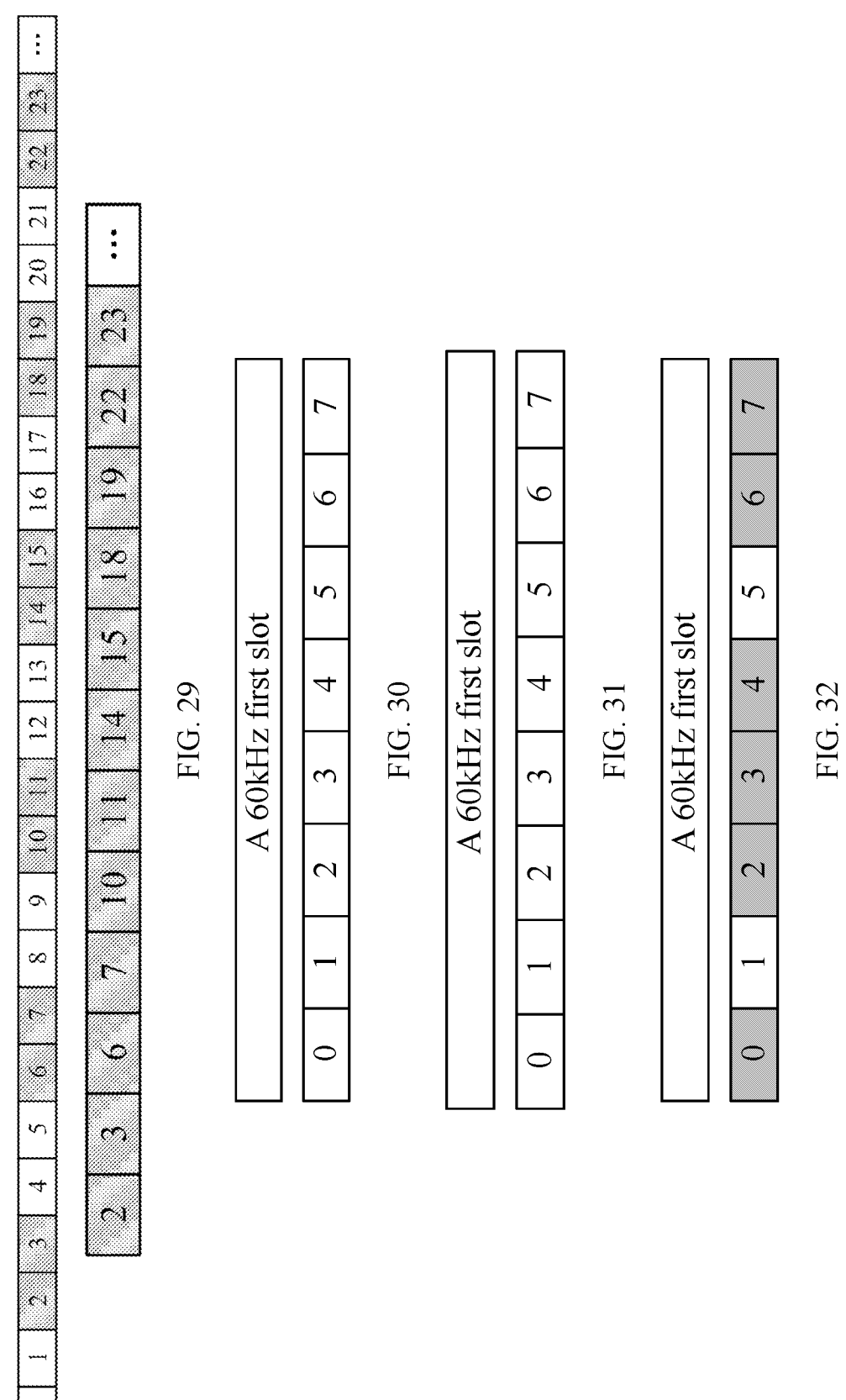
Figures 33, 34, 35, 36, 37:
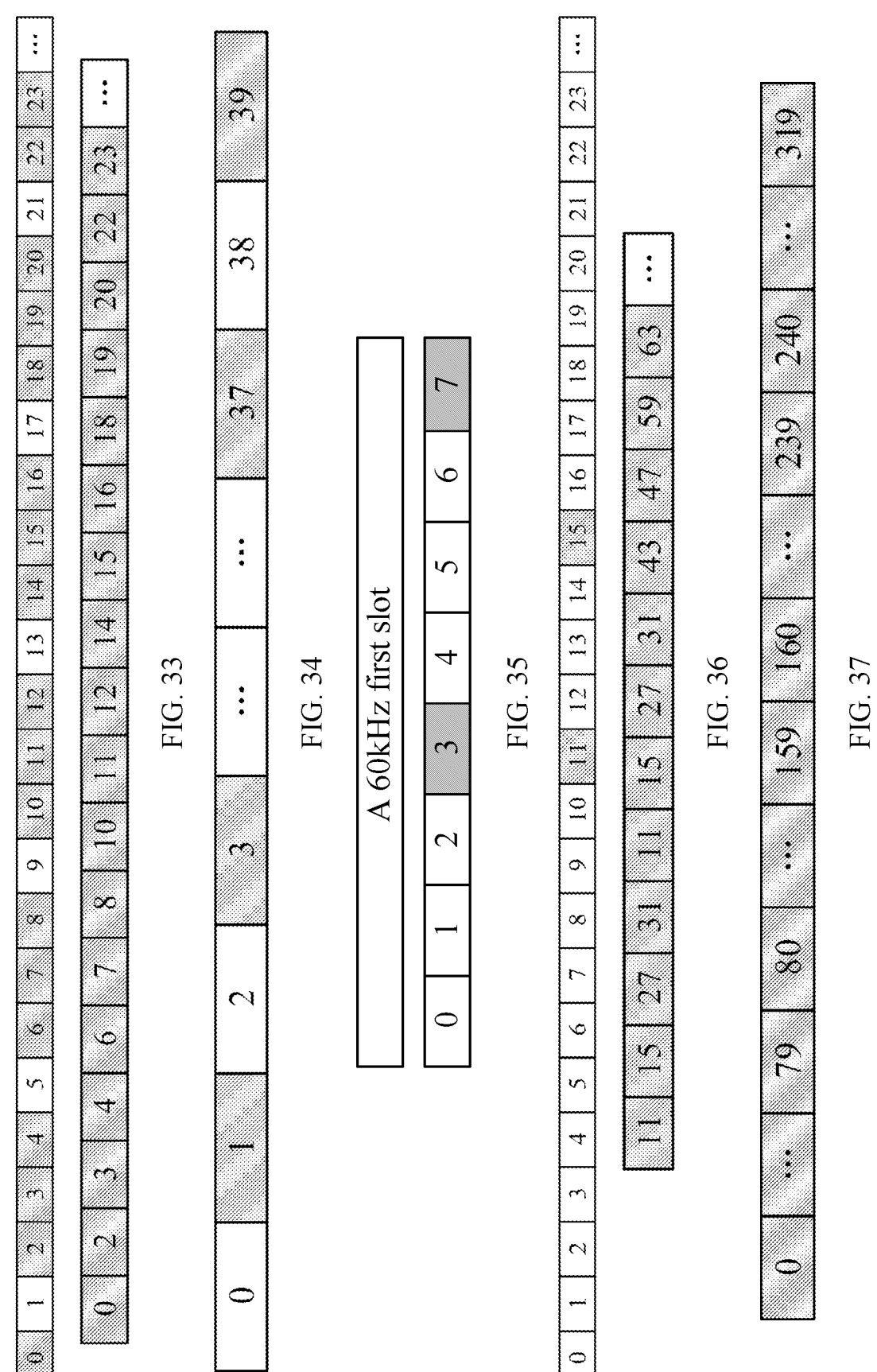
Figures 38, 39, 40:
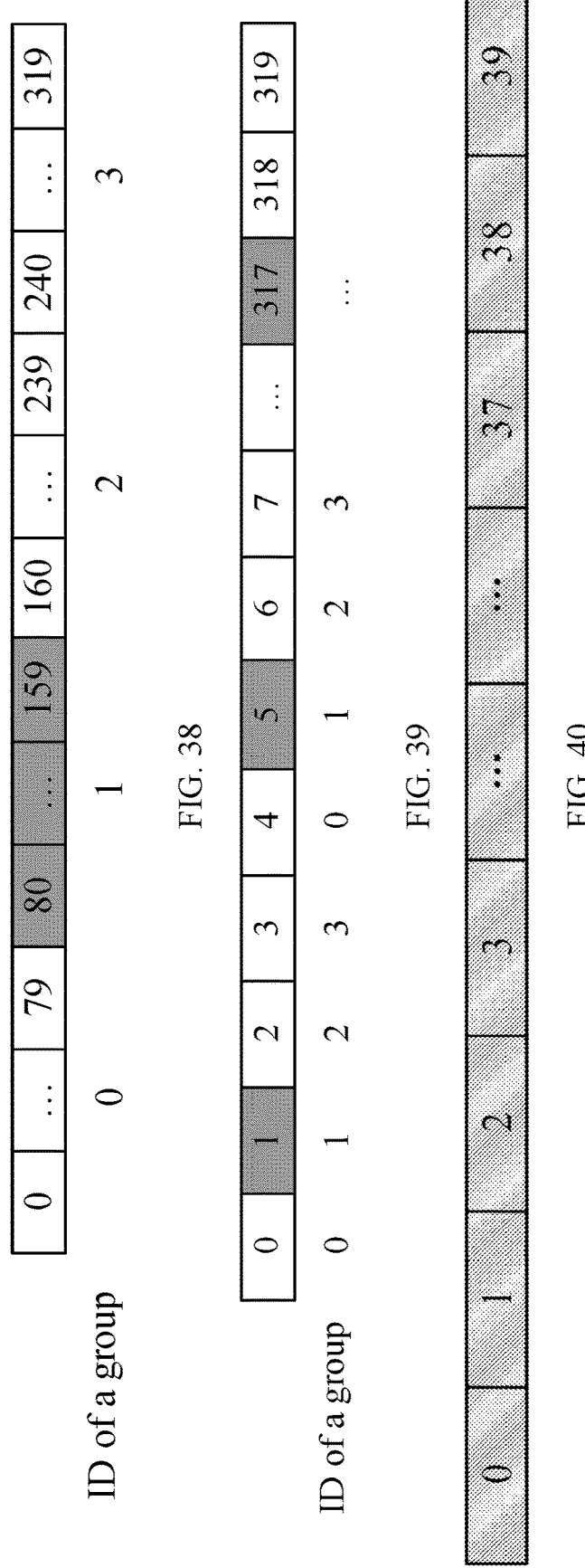
Figures 45, 46:
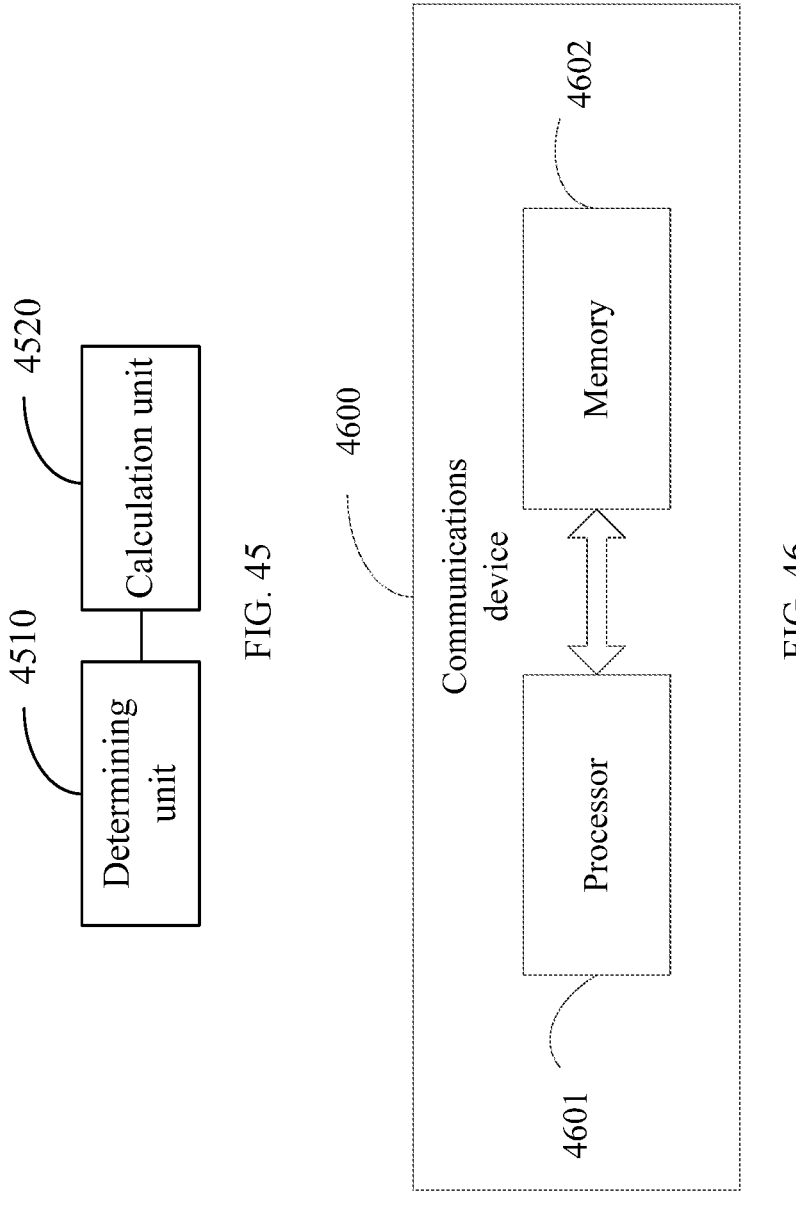
Figure 47:
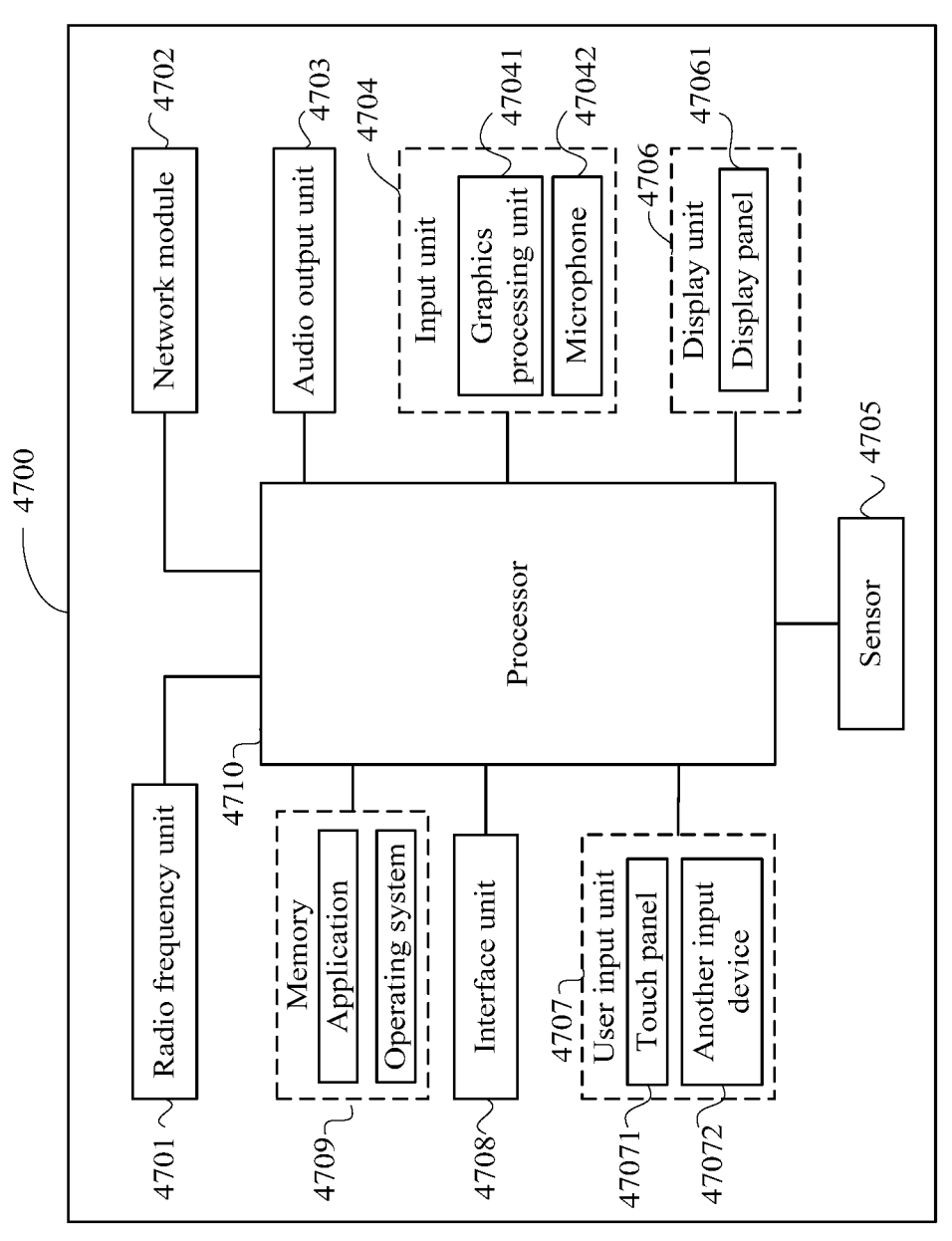

FIG. 29 is a schematic diagram 1 of a slot set in which an RO can be sent within a frame according to an embodiment of this application;

FIG. 30 is a schematic diagram 8 of a second slot number group according to an embodiment of this application;

FIG. 31 is a schematic diagram 9 of a second slot number group according to an embodiment of this application;

FIG. 32 is a schematic diagram 2 of a second slot set according to an embodiment of this application;

FIG. 33 is a schematic diagram 2 of a slot set in which an RO can be sent within a frame according to an embodiment of this application;

FIG. 34 is a schematic diagram 2 of a first slot set according to an embodiment of this application;

FIG. 35 is a schematic diagram 3 of a second slot set according to an embodiment of this application;

FIG. 36 is a schematic diagram 3 of a slot set in which an RO can be sent within a frame according to an embodiment of this application;

FIG. 37 is a schematic diagram 4 of a slot set in which an RO can be sent within a frame according to an embodiment of this application;

FIG. 38 is a schematic diagram 1 of grouping of a slot set in which an RO can be sent within a frame according to an embodiment of this application;

FIG. 39 is a schematic diagram 2 of grouping of a slot set in which an RO can be sent within a frame according to an embodiment of this application;

FIG. 40 is a schematic diagram 3 of a first slot set according to an embodiment of this application;

FIG. 41 is a schematic diagram 4 of a second slot set according to an embodiment of this application;

FIG. 42 is a schematic diagram 5 of a slot set in which an RO can be sent within a frame according to an embodiment of this application;

FIG. 43 is a schematic diagram 3 of grouping of a slot set in which an RO can be sent within a frame according to an embodiment of this application;

FIG. 44 is a schematic diagram 4 of grouping of a slot set in which an RO can be sent within a frame according to an embodiment of this application;

FIG. 45 is a schematic structural diagram of a random access apparatus according to an embodiment of this application;

FIG. 46 is a schematic structural diagram of a communications device according to an embodiment of this application; and FIG. 47 is a schematic diagram of a hardware structure of a terminal according to an embodiment of this application.

DETAILED DESCRIPTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects, and do not need to be used to describe a specific order or sequence. It should be understood that data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "I" generally represents an "or" relationship between associated objects.

It should be noted that the technology described in the embodiments of this application is not limited to a Long Time Evolution (LTE)/LTE-advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a new radio (NR) system is described in the following description for illustrative purposes, and the NR terminology is used in most of the following description, although these technologies can also be applied to applications other than the NR system application, such as the $6^{th}$ generation (6G) communications system.

Figure 1:
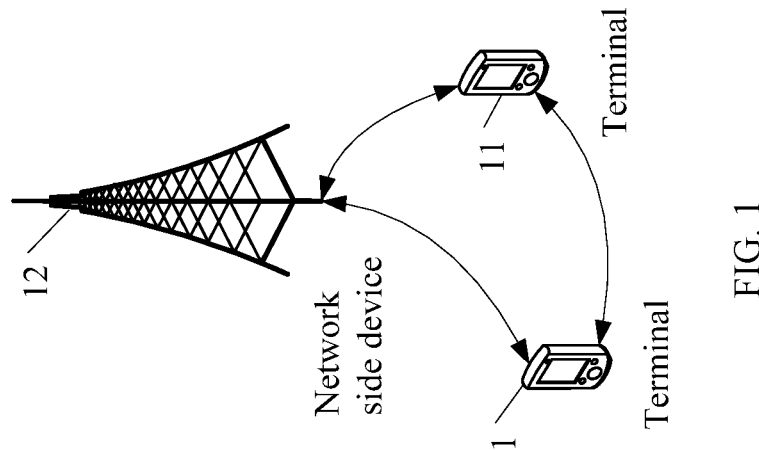
FIG. 1 is a structural diagram of a wireless communications system to which this embodiment of this application is applicable.

FIG. 1 is a structural diagram of a wireless communications system to which embodiments of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer or a notebook computer, a personal digital assistant (PDA), a palmtop computer, a netbook, an ultramobile personal computer (UMPC), a mobile internet device (MID), a wearable device, vehicle user equipment (VUE), or pedestrian user equipment (PUE). The wearable device includes a bracelet, a headset, glasses, and the like. It should be noted that a specific type of the terminal 11 is not limited in this embodiment of this application. The network side device 12 may be of a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

The random access method and apparatus, terminal, and storage medium provided by the embodiments of this application are described in detail below through some embodiments and application scenarios with reference to the accompanying drawings.

Preamble transmission of a cell is located on a set of PRACH slots. A PRACH slot may contain multiple ROs (PRACH occasion) in time domain, and each RO is used to transmit a preamble of a specific format. A time domain resource that can be used to transmit the random access preamble depends on the PRACH-Configuration field. The terminal searches Table6.3.3.2-2 (a frequency range is FR1 and paired spectrum/supplementary uplink (SUL) is used), Table 6.3.3.2-3 (frequency range is FR1 and unpaired spectrum is used) or Table 6.3.3.2-4 (the frequency range is FR2 and unpaired spectrum is used) of a corresponding configuration table TS38.211 through PRACH-ConfigurationIndex, to obtain a preamble format and available PRACH time domain resources used by a corresponding cell.

TABLE 6.3.3.2-2

Random access configurations for FR1 and paired spectrum/supplementary uplink.

| PRACH Configuration Index | Preamble format | $n_{SFN}$ mod x = y | | Subframe number | Starting symbol | $N_t^{RA,slot}$, number of time-domain PRACH occasions within a PRACH slot | $N_{dur}^{RA}$, PRACH duration |
|---|---|---|---|---|---|---|---|
| | | x | y | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| . . . | . . . | . . . | . . . | . . . | . . . | . . . | . . . | . . . |

TABLE 6.3.3.2-3

Random access configurations for FR1 and unpaired spectrum.

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| . . . | . . . | . . . | . . . | . . . | . . . | . . . | . . . | . . . |

TABLE 6.3.3.2-4

Random access configurations for FR2 and unpaired spectrum.

| PRACH Configuration Index | Preamble format | $n_{SFN}$ mod x = y | | slot number | Starting symbol | Number of PRACH slots within a 60 kHz slot | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | A1 | 16 | 1 | 4, 9, 14, 19, 24, 29, 34, 39 | 0 | 2 | 6 | 2 |
| 1 | A1 | 16 | 1 | 3, 7, 11, 15, 19, 23, 27, 31, 35, 39 | 0 | 1 | 6 | 2 |
| 2 | A1 | 8 | 1, 2 | 9, 19, 29, 39 | 0 | 2 | 6 | 2 |
| 3 | A1 | 8 | 1 | 4, 9, 14, 19, 24, 29, 34, 39 | 0 | 2 | 6 | 2 |
| 4 | A1 | 8 | 1 | 3, 7, 11, 15, 19, 23, 27, 31, 35, 39 | 0 | 1 | 6 | 2 |
| . . . | . . . | . . . | . . . | . . . | . . . | . . . | . . . | . . . |

For FR1, its slot is based on the 15 kHz subcarrier spacing as a reference. For FR2, its slot is based on the 60 kHz subcarrier spacing as a reference.

Meanings of parameters in the above three tables are as follows:

PRACH Configuration Index: Index value of RO configuration, which is configured by RRC signaling.

Preamble format: Preamble format used.

$n_{SFN}$ mod x=position of a radio frame in which the RO is located, x is a PRACH period with SFN0 as the starting point, and y is used to calculate a position of the radio frame in which the RO is located within the PRACH period, for example, $n_{SFN}$ mod 1=0 means that each radio frame can be used to send a preamble.

Subframe/slot number: subframe or slot number in which the RO is located in a transmittable radio frame.

Starting symbol: In each subframe/60 kHz slot containing an RO, a number of a starting symbol number of the first RO in time domain. The 60 kHz slot is used as the reference slot.

Number of PRACH slots within a subframe/60 kHz slot: number of PRACH slots contained within a subframe or 60 kHz slot.

$N_t^{RA,slot}$:

number of ROs included in one PRACH slot, that is, a number of time domain sending occasions for preamble.

$N_{dur}^{RA}$:

number of OFDM symbols occupied by one RO.

According to the above parameter set, the starting OFDM symbol position of each RO included in the PRACH slot within a reference slot can be calculated as:

$$l = l_0 + n_t^{RA} N_{dur}^{RA} + 14 n_{slot}^{RA}$$

where:

$l_0$ is starting symbol;

$$n_t^{RA} \text{ is the } n_t^{RAth}$$

PRACH occasion in a PRACH slot, and its numbers are from 0 to $$N_t^{RA,slot} - 1;$$

and $$N_{dur}^{RA}$$

is a number of OFDM symbols occupied by a PRACH occasion in time domain.

If the subcarrier spacing of the PRACH is $\Delta f_{RA} \in \{1.25, 5, 15, 60\}$ kHz, a slot number of a PRACH slot in a reference slot is $$n_{slot}^{RA} = 0; \text{ if } \Delta f_{RA} \in \{30, 120\} \text{ kHz}$$

and the number of PRACH slots contained in a subframe or 60 kHz slot is 1, a slot number of a PRACH slot in a reference slot is $$n_{slot}^{RA} = 1;$$

otherwise, a slot number of a PRACH slot in a reference slot is $$n_{slot}^{RA} \in \{0, 1\}.$$

As an example, it is assumed that FR2 and unpaired spectrum/SUL are used, and the subcarrier spacing of the preamble is 120 kHz. When the indicated PRACH Configuration Index is 74, Table 6.3.3.2-4 is queried to obtain that in this configuration, the UE can only transmit a preamble of format A3 in slots {9, 19, 29, 39} (for FR2, the subcarrier spacing of 60 kHz is used as a reference for slot numbering) of the system frame (that is, all system frames) satisfying $n_{SFN}\%1=0$. A slot contains 2 consecutive PRACH slots (a corresponding value of Number of PRACH slots within a 60 kHz slot is 2), and a PRACH slot contains $$N_t^{RA,slot} = 1 \ RO$$

in the time domain, each RO occupies $$N_{dur}^{RA} = 6 \ OFDM$$

symbols, and a PRACH starts to be transmitted from the $8^{th}$ OFDM symbol (a corresponding value of Starting symbol is 7) of each PRACH slot.

Because $\Delta f_{RA}=120$ kHz and Number of PRACH slots within 60 kHz slot is 2, the slot number of the PRACH slot in a reference slot is $$n_{slot}^{RA} \in \{0, 1\}.$$

According to the above parameter set, the starting OFDM symbol position of each RO included in the PRACH slot within a reference slot can be calculated as:

$$l = l_0 + n_t^{RA} N_{dur}^{RA} + 14 n_{slot}^{RA} = 7 + 0 \times 6 + 14 \times \{0, 1\} = \{7, 21\}$$

FIG. 2 is a schematic diagram of RO time domain resource configuration when a PRACH SCS is 120 kHz in a case of FR2.

It can be understood that, when the SCS is greater than 120 kHz, even if the subcarrier spacing of a reference slot of FR2 60 kHz is used, the number of PRACH slots in one reference slot exceeds 2, but the number of PRACH slots in a reference slot in the existing configuration table (Number of PRACH slots within 60 kHz slot) can only be 1 or 2, and cannot be applied to a higher subcarrier spacing.

FIG. 3 is a schematic flowchart of a random access method according to an embodiment of this application. As shown in FIG. 3, the method includes:

Step 300: A terminal determines a random access occasion RO time domain position group.

The RO time domain position group includes at least one of the following:

a transmittable frame number group and a first slot number group, and a second slot number group;

where the transmittable frame number group is used to indicate a transmittable frame, and the transmittable frame is a radio frame where a RO that can be used to transmit a preamble is located;

the first slot number group is used to indicate a first slot that is based on a first subcarrier spacing and in which the RO is located in the transmittable frame; or the second slot number group is used to indicate a second slot that is based on a second subcarrier spacing and in which the RO is located in the first slot.

It can be understood that the second slot number group is determined on the basis of the first slot number group.

In some embodiments, the first slot based on the first subcarrier spacing is a reference slot, and the second slot based on the second subcarrier spacing is a PRACH slot.

In some embodiments, the terminal determines a random access occasion RO time-domain position group, where the RO time-domain position group includes a transmittable frame number group and a first slot number group.

In some embodiments, the terminal determines a random access occasion RO time domain position group, where the RO time domain position group includes a transmittable frame number group and a first slot number group, and a second slot number group.

In some embodiments, the terminal obtains a random access channel RACH configuration table according to at least one of the frequency range for sending a physical random access channel PRACH, the subcarrier spacing of the, PRACH, and the frequency band characteristic for sending a PRACH; and searches the RACH configuration table according to a PRACH configuration index indicated by a network, to determine the random access occasion RO time domain position group.

Step 301: Select a first RO from the RO time domain position group, and calculating a random access radio network temporary identifier RA-RNTI of the first RO.

After the terminal determines the random access occasion RO time domain location group, the terminal selects an RO from the RO time domain location group, and calculates the Random Access Radio Network Temporary Identifier (RA-RNTI) of the RO.

In the embodiments of this application, the terminal determines the random access timing RO time domain position group, where the RO time domain position group includes at least one of the following: a transmittable frame number group and a first slot number group; or a second slot number group, and then the terminal selects an RO from the RO time domain position group, and calculates the random access radio network temporary identifier RA-RNTI of the RO, which can configure RO time-frequency resources when the subcarrier spacing of the PRACH supported by the system is greater than 120 kHz.

In some embodiments, the first subcarrier spacing or the second subcarrier spacing is related to at least one of the following:

a subcarrier spacing for sending a PRACH;
a frequency range for sending a PRACH;
a format for sending a PRACH; or
a sequence length for sending a PRACH.

In some embodiments, the first slot number group is related to at least one of the following:

a subcarrier spacing for sending a PRACH;
a frequency range for sending a PRACH;
a frequency band characteristic for sending a PRACH;
a format for sending a PRACH;
a sequence length for sending a PRACH;
a PRACH configuration index;
the first subcarrier spacing;
a number L of slots that are based on the first subcarrier spacing and that are contained in each radio frame;
a size M1 of the first slot number group; or
a configuration index of the first slot number group.

In some embodiments, the second slot number group is related to at least one of the following:

a subcarrier spacing for sending a PRACH;
a frequency range for sending a PRACH;
a frequency band characteristic for sending a PRACH;
a format for sending a PRACH;
a sequence length for sending a PRACH;
a PRACH configuration index;
the first subcarrier spacing;
the second subcarrier spacing;
a number L of slots that are based on the first subcarrier spacing and that are contained in each radio frame;
a ratio N of the second subcarrier spacing to the first subcarrier spacing;
a size M1 of the first slot number group;
a size M2 of the second slot number group;
a configuration index of the first slot number group; or
a configuration index of the second slot number group.

In some embodiments, the determining, by a terminal, a random access occasion RO time domain position group includes:

obtaining a random access channel RACH configuration table according to at least one of the frequency range for sending a physical random access channel PRACH, the subcarrier spacing of the PRACH, and the frequency band characteristic for sending a PRACH;
searching the RACH configuration table according to a PRACH configuration index indicated by a network, to obtain the transmittable frame number group and a size M1 of the first slot number group in which the RO is located; and
determining that the first slot number group is M1 values predefined between 0 and L−1;
where L is a number of slots that are based on the first subcarrier spacing and that are contained in each radio frame; and
the M1 values of the first slot number group are one or more combinations of M1 values obtained from 0 to L−1.

In some embodiments, the terminal obtains a random access channel RACH configuration table according to at least one of the frequency range for sending a physical random access channel PRACH, the subcarrier spacing of the PRACH, and the frequency band characteristic for sending a PRACH.

In some embodiments, parameters included in the random access channel RACH configuration table are the same as those in Table 6.3.3.2-2 (a frequency range is FR1 and paired spectrum/supplementary uplink (SUL) is used), Table 6.3.3.2-3 (a frequency range is FR1 and unpaired spectrum is used) or Table 6.3.3.2-4 (a frequency range is FR2 and unpaired spectrum is used).

In some embodiments, the terminal searches the RACH configuration table according to a PRACH configuration index indicated by a network, to obtain the transmittable frame number group and a size M1 of the first slot number group in which the RO is located.

In the embodiment of this application, the method for the terminal to determine the first slot number group is as follows:

determining that the first slot number group is M1 values predefined between 0 and L−1;
where L is a number of slots that are based on the first subcarrier spacing and that are contained in each radio frame; and
the M1 values of the first slot number group are one or more combinations of M1 values obtained from 0 to L−1.

In some embodiments, that the predefined M1 values of the first slot number group are one or more combinations of M1 values obtained from 0 to L−1 includes one or more of the following:

the first M1 values from 0 to L−1;
the last M1 values from 0 to L−1;
all or a part of X satisfying X mod (rounded up or rounded down value of L/M1)=Y, where X is an integer value between 0 and L−1, and Y is one or more predefined values;
M1 consecutive values between 0 and L−1; and
multiple M1 consecutive values between 0 and L−1.

The following uses an example to illustrate how the terminal determines the first slot number group.

In the 52.6 GHz-71 GHz system, each first subcarrier spacing is 480 KHz, and then the number L of slots based on the first subcarrier spacing in each frame is 320.

The UE searches the RACH configuration table for the PRACH configuration index corresponding to the network indication, and obtains the transmittable frame number group in which the RO is located.

The UE then determines the first slot number group:

In some embodiments, the size M1 of the first slot number group in the RACH configuration table may be 80 or 160.

If the UE searches the RACH configuration table for the PRACH configuration index corresponding to the network indication, and obtains that the size M1 of the first slot number group is 160, the first slot number group is 160 values predefined by the protocol between 0 and 319.

The M1 values of the first slot number group predefined by the protocol are 160 values between 0 and 319, and one or more possible combinations are:

a) the first 160 values between 0 and 319, as shown in FIG. 4, or the last 160 values between 0 to 319, as shown in FIG. 5. FIG. 4 is a schematic diagram 1 of M1 values of a first slot number group according to an embodiment of this application. FIG. 5 is a schematic diagram 2 of M1 values of a first slot number group according to an embodiment of this application.

b) All or a part of X satisfying that X mod 2 (L/M1=2) is equal to a specific value Y, where Y is one or more values predefined by the protocol.

For example, Y=1: M1 values of the first slot number group are 1, 3, . . . , 319, as shown in FIG. 6.

For example, Y=0, 1: M1 values of the first slot number group are 2, 3, 6, 7, . . . , as shown in FIG. 7.

FIG. 6 is a schematic diagram 3 of M1 values of a first slot number group according to an embodiment of this application. FIG. 7 is a schematic diagram 4 of M1 values of a first slot number group according to an embodiment of this application.

c) One or more of 160 consecutive values between 0 and 319, as shown in FIG. 8. FIG. 8 is a schematic diagram 5 of M1 values of a first slot number group according to an embodiment of this application.

In this embodiment of this application, according to at least one of the frequency range for sending a PRACH, the subcarrier spacing of the PRACH, and the frequency band characteristic for sending a PRACH, the random access channel RACH configuration table is obtained, and according to the PRACH configuration index indicated by the network, the RACH configuration table is queried to obtain the transmittable frame number group and a size M1 of the first slot number group in which the RO is located; and then, it is determined that the first slot number group is predefined M1 values between 0 and L−1. Therefore, it is implemented that when the subcarrier spacing of the PRACH is greater than 120 kHz, the RO time frequency resource is configured.

In some embodiments, the determining, by a terminal, a random access occasion RO time domain position group includes the following steps:

obtaining a random access channel RACH configuration table according to at least one of the frequency range for sending a physical random access channel PRACH, the subcarrier spacing of the PRACH, and the frequency band characteristic for sending a PRACH;

searching the RACH configuration table according to a PRACH configuration index indicated by a network, to obtain the transmittable frame number group and a size M1 of the first slot number group in which the RO is located, and a configuration index k1 of the first slot number group; and determining that the first slot number group is M1 values predefined between 0 and L−1.

In some embodiments, a random access channel RACH configuration table obtained by the terminal according to at least one of the frequency range for sending a physical random access channel PRACH, the subcarrier spacing of the PRACH, and the frequency band characteristic for sending a PRACH further includes a configuration index k1 of the first slot number group.

The terminal searches the RACH configuration table according to a PRACH configuration index indicated by a network, to obtain the transmittable frame number group and a size M1 of the first slot number group in which the RO is located, and the configuration index k1 of the first slot number group.

In some embodiments, the determining the first slot number group by the terminal includes:

determining that the first slot number group is M1 values predefined between 0 and L−1 according to the configuration index k1 of the first slot number group;

where L is a number of slots that are based on the first subcarrier spacing and that are contained in each radio frame; and the configuration index k1 of the first slot number group is used to indicate M1 values of the first slot number group; and the M1 values of the first slot number group are one or more combinations of M1 values obtained from 0 to L−1.

In some embodiments, that the predefined M1 values of the first slot number group are one or more combinations of M1 values obtained from 0 to L−1 includes one or more of the following:

the first M1 values from 0 to L−1;

the last M1 values from 0 to L−1;

all or a part of X satisfying X mod (rounded up or rounded down value of L/M1)=Y, where X is an integer value between 0 and L−1, and Y is one or more predefined values;

M1 consecutive values between 0 and L−1; and multiple M1 consecutive values between 0 and L−1.

The following uses an example to illustrate how the terminal determines the first slot number group.

For example: the size M1 of the first slot number group in the RACH configuration table may be 80 or 160.

For M1=80, the protocol predefines K1=2 candidates:

The UE searches the RACH configuration table for the PRACH configuration index corresponding to the network indication, and obtains that the size M1 of the first slot number group is 80 and the configuration index k1 of the first slot number group is 0, and 160 values of the first slot number group are indicated.

The UE searches the RACH configuration table for the PRACH configuration index corresponding to the network indication, and obtains that the size M1 of the first slot number group is 80 and the configuration index k1 of the first slot number group is 1, and 160 values of the first slot number group are indicated.

FIG. 9 is a schematic diagram of a first slot number group when M1=80 and candidate k1=0 according to an embodiment of this application. FIG. 10 is a schematic diagram of a first slot number group when M1=80 and candidate k1=1 according to an embodiment of this application.

For M1=160, the protocol predefines K1=2 candidates:

The UE searches the RACH configuration table for the PRACH configuration index corresponding to the network indication, and obtains that the size M1 of the first slot number group is 160 and the configuration index k1 of the first slot number group is 0, and 160 values of the first slot number group are indicated.

The UE searches the RACH configuration table for the PRACH configuration index corresponding to the network indication, and obtains that the size M1 of the first slot number group is 160 and the configuration index k1 of the first slot number group is 1, and 160 values of the first slot number group are indicated.

FIG. 11 is a schematic diagram of a first slot number group when M1=160 and candidate k1=0 according to an embodiment of this application. FIG. 12 is a schematic diagram of a first slot number group when M1=160 and candidate k1=1 according to an embodiment of this application.

In this embodiment of this application, according to at least one of the frequency range for sending a PRACH, the subcarrier spacing of the PRACH, and the frequency band characteristic for sending a PRACH, the random access channel RACH configuration table is obtained, and according to the PRACH configuration index indicated by the network, the RACH configuration table is queried to obtain the transmittable frame number group and a size M1 of the first slot number group in which the RO is located, and the configuration index k1 of the first slot number group; and then, it is determined that the first slot number group is predefined M1 values between 0 and L−1 according to the configuration index k1 of the first slot number group. Therefore, it is implemented that when the subcarrier spacing of the PRACH is greater than 120 kHz, the RO time frequency resource is configured.

In some embodiments, the determining, by a terminal, a random access occasion RO time domain position group includes:

obtaining a random access channel RACH configuration table according to at least one of the frequency range for sending a physical random access channel PRACH, the subcarrier spacing of the PRACH, and the frequency band characteristic for sending a PRACH;

searching the RACH configuration table according to a PRACH configuration index indicated by a network, to obtain the transmittable frame number group, the first slot number group, and a size M2 of the second slot number group in which the RO is located; and determining that the second slot number group is M2 values predefined between 0 and N−1;

where N is a ratio of the second subcarrier spacing to the first subcarrier spacing; and the M2 values of the second slot number group are one or more combinations of M2 values obtained from 0 to N−1.

In some embodiments, according to at least one of the frequency range for sending a physical random access channel PRACH, the subcarrier spacing of the PRACH, and the frequency band characteristic for sending a PRACH, the random access channel RACH configuration table is obtained. The random access channel RACH configuration table includes the following parameters: a PRACH configuration index, a preamble format, a transmittable frame $n_{SFN}$ mod x=y, a subframe/slot number where RO is located in a radio frame, a starting symbol of a first RO in time domain in each subframe/first slot containing an RO, the size M2 of the second slot number group, a number of ROs contained in a PRACH slot, and a number of OFDM symbols occupied by one RO.

It can be understood that the terminal determines the RO time domain resources, and searches the RACH configuration table according to a PRACH configuration index indicated by a network, to directly obtain the transmittable frame number group, the first slot number group, and a size M2 of the second slot number group in which the RO is located.

The first slot number group can be used to send the subframe or the slot number Subframe/slot number in which the RO is located in the frame.

Then, the terminal determines the second slot number group, that is, determines that the second slot number group is predefined M2 values between 0 and N−1.

N is a ratio of the second subcarrier spacing to the first subcarrier spacing; and the M2 values of the second slot number group are one or more combinations of M2 values obtained from 0 to N−1.

In some embodiments, that the M2 values of the second slot number group are one or more combinations of M2 values obtained from 0 to N−1 includes one or more of the following:

the first M2 values from 0 to N−1;

the last M2 values from 0 to N−1;

all or a part of X satisfying X mod (rounded up or rounded down value of N/M2)=Y, where X is an integer value between 0 and N−1, and Y is one or more predefined values;

M2 consecutive values between 0 and N−1; and multiple M2 consecutive values between 0 and N−1.

An example is used below to illustrate how the terminal determines the second slot number group.

In the 52.6 GHz-71 GHz system, the first subcarrier spacing is 60 KHz, and the second subcarrier spacing is 480 KHz, and then the number L of slots based on the first subcarrier spacing in each frame is 40, and the ratio N of the second subcarrier spacing to the first subcarrier spacing is 8.

The terminal searches the RACH configuration table for the PRACH configuration index correspondingly indicated by the network, and obtains the transmittable frame number group in which the RO is located and the first slot number group of the RO in the transmittable frame based on the first subcarrier spacing.

The method for the terminal to determine the second slot number group:

In some embodiments, the size M of the second slot number group may be 2 or 4.

The terminal searches the RACH configuration table for the PRACH configuration index corresponding to the network indication, and obtains that the size M2 of the second slot number group is 4, and then the second slot number group is 4 values predefined by the protocol between 0 and 7.

The M2 values of the second slot number group predefined by the protocol are 4 values between 0 and 7, and one or more possible combinations are:

a) The first 4 values or the last 4 values between 0 and 7: {0, 1, 2, 3} or {4, 5, 6, 7}. Refer to FIG. 13 and FIG. 14. FIG. 13 is a schematic diagram 1 of a second slot number group according to an embodiment of this application. FIG. 14 is a schematic diagram 2 of a second slot number group according to an embodiment of this application.

b) All or a part of X satisfying that X mod 2 (N/M2=2) is equal to a specific value Y, where Y is one or more values predefined by the protocol.

For example, Y=1, and the second slot number group is {1, 3, 5, 7}. Refer to FIG. 15. FIG. 15 is a schematic diagram 3 of a second slot number group according to an embodiment of this application.

For example, Y=0, 1, and the second slot number group is {2, 3, 6, 7}. Refer to FIG. 16. FIG. 16 is a schematic diagram 4 of a second slot number group according to an embodiment of this application.

c) One or more of 4 consecutive values between 0 and 8, the second slot number group is {2, 3, 4, 5}, and refer to FIG. 17. FIG. 17 is a schematic diagram 5 of a second slot number group according to an embodiment of this application.

In this embodiment of this application, according to at least one of the frequency range for sending a PRACH, the subcarrier spacing of the PRACH, and the frequency band characteristic for sending a PRACH, the random access channel RACH configuration table is obtained, and according to the PRACH configuration index indicated by the network, the RACH configuration table is queried to obtain a size of the transmittable frame number group, the first slot number group, and the second slot number group in which the RO is located; and then, it is determined that the second slot number group is predefined M2 values between 0 and N−1. Therefore, it is implemented that when the subcarrier spacing of the PRACH is greater than 120 kHz, the RO time frequency resource is configured.

In some embodiments, the determining, by a terminal, a random access occasion RO time domain position group includes:

obtaining a random access channel RACH configuration table according to at least one of the frequency range for sending a physical random access channel PRACH, the subcarrier spacing of the PRACH, and the frequency band characteristic for sending a PRACH;

searching the RACH configuration table according to a PRACH configuration index indicated by a network, to obtain the transmittable frame number group, the first slot number group, and a size M2 of the second slot number group in which the RO is located, and a configuration index k2 of the second slot number group; and determining that the second slot number group is M2 values predefined between 0 and N−1;

In some embodiments, a random access channel RACH configuration table obtained by the terminal according to at least one of the frequency range for sending a physical random access channel (PRACH), the subcarrier spacing of the PRACH, and the frequency band characteristic for sending a PRACH further includes a configuration index k2 of the second slot number group. the configuration index k2 of the second slot number group is used to indicate M2 values of the second slot number group.

It can be understood that the terminal searches the RACH configuration table according to a PRACH configuration index indicated by a network, to directly obtain the transmittable frame number group, the first slot number group, and a size M2 of the second slot number group in which the RO is located, and a configuration index k2 of the second slot number group.

In some embodiments, the method for the terminal to determine the second slot number group is:

determining that the second slot number group is M2 values predefined between 0 and N−1 according to the configuration index k2 of the second slot number group;

where N is a ratio of the second subcarrier spacing to the first subcarrier spacing;

the configuration index k2 of the second slot number group is used to indicate M2 values of the second slot number group; and the M2 values of the second slot number group are one or more combinations of M2 values obtained from 0 to N−1.

In some embodiments, that the M2 values of the second slot number group are one or more combinations of M2 values obtained from 0 to N−1 includes one or more of the following:

the first M2 values from 0 to N−1;

the last M2 values from 0 to N−1;

all or a part of X satisfying X mod (rounded up or rounded down value of N/M2)=Y, where X is an integer value between 0 and N−1, and Y is one or more predefined values;

M2 consecutive values between 0 and N−1; and multiple M2 consecutive values between 0 and N−1.

An example is used below to illustrate how the terminal determines the second slot number group.

In some embodiments, the size M2 of the second slot number group may be 2 or 4.

For M2=2, the protocol predefines K2=2 candidates:

The UE searches the RACH configuration table for the PRACH configuration index corresponding to the network indication, and obtains that the size M2 of the second slot number group is 2 and the configuration index k1 of the second slot number group is 0, and 2 values of the second slot number group are indicated. As shown in FIG. 18, the second slot number group is {3, 7}.

The UE searches the RACH configuration table for the PRACH configuration index corresponding to the network indication, and obtains that the size M2 of the second slot number group is 2 and the configuration index k2 of the second slot number group is 1, and 2 values of the second slot number group are indicated. As shown in FIG. 19, the second slot number group is {1, 5}.

FIG. 18 is a schematic diagram of a second slot number group when M2=2 and candidate k2=0 according to an embodiment of this application. FIG. 19 is a schematic diagram of a second slot number group when M2=2 and candidate k2=1 according to an embodiment of this application.

For M2=4, the protocol predefines K2=2 candidates:

The UE searches the RACH configuration table for the PRACH configuration index corresponding to the network indication, and obtains that the size M2 of the second slot number group is 4 and the configuration index k1 of the second slot number group is 0, and 4 values of the second slot number group are indicated. As shown in FIG. 20, the second slot number group is {4, 5, 6, 7}.

The UE searches the RACH configuration table for the PRACH configuration index corresponding to the network indication, and obtains that the size M2 of the second slot number group is 4 and the configuration index k2 of the second slot number group is 1, and 4 values of the second slot number group are indicated. As shown in FIG. 21, the second slot number group is {2, 3, 6, 7}.

FIG. 20 is a schematic diagram of a second slot number group when M2=4 and candidate k2=0 according to an embodiment of this application. FIG. 21 is a schematic diagram of a second slot number group when M2=4 and candidate k2=1 according to an embodiment of this application.

In this embodiment of this application, according to at least one of the frequency range for sending a PRACH, the subcarrier spacing of the PRACH, and the frequency band characteristic for sending a PRACH, the random access channel RACH configuration table is obtained, and according to the PRACH configuration index indicated by the network, the RACH configuration table is queried to obtain a size of the transmittable frame number group, the first slot number group, and the second slot number group in which the RO is located, and the configuration index of the second slot number group; and then, it is determined that the second slot number group is predefined M2 values between 0 and N−1. Therefore, it is implemented that when the subcarrier spacing of the PRACH is greater than 120 kHz, the RO time frequency resource is configured.

After the terminal determines the random access occasion RO time domain position group, the terminal selects a first RO from the RO time domain position group, and calculates a random access radio network temporary identifier RA-RNTI of the first RO.

However, the current calculation of RA-RNTI is only applicable to the case in which the PRACH SCS is less than 120 KHz. If the original RA-TNTI calculation is used, the calculation of different RO time frequency resources results in a same RA-RNTI. If the calculation formula of RA-RNTI is simply extended to a high PRACH SCS, 16 bit RA-RNTI data overflow occurs. Therefore, it is also necessary to design a corresponding RA-RNTI calculation method for RO time domain resource allocation of a high PRACH SCS. The embodiment of this application provides a new RA-TNTI calculation method, which can avoid data overflow.

In some embodiments, the calculating the random access radio network temporary identifier RA-RNTI of the first RO includes:

determining a time domain number corresponding to the first RO; and calculating a RA-RNTI of the first RO based on the time domain number.

It can be understood that, in this embodiment of this application, when calculating the RA-TNTI, the terminal first needs to determine the time domain number corresponding to the first RO.

In some embodiments, the time domain number is a third slot number based on a third subcarrier spacing, where the third subcarrier spacing is determined by one of the following:

the third subcarrier spacing is the first subcarrier spacing;

the third subcarrier spacing is the second subcarrier spacing or the subcarrier spacing of the PRACH; or in a case that the subcarrier spacing of the PRACH satisfies a first condition or belongs to a first set, the third subcarrier spacing is the second subcarrier spacing or the subcarrier spacing of the PRACH; otherwise, the third subcarrier spacing is the first subcarrier spacing or the fourth subcarrier spacing, where the fourth subcarrier spacing is a predefined subcarrier spacing.

For example, in a 52.6 GHz to 71 GHz system, the first subcarrier spacing is 60 KHz and the second subcarrier spacing is 480 KHz, and then the first slot can be configured in any way, and the second slot is configured as follows:

For M2=1, FIG. 22 is a schematic diagram of a second slot number group when M2=1 according to an embodiment of this application. In this case, the second slot number group is {7}.

For M2=2, FIG. 23 is a schematic diagram of a second slot number group when M2=2 according to an embodiment of this application. In this case, the second slot number group is {3, 7}.

The UE selects an RO from the RO time domain position group, determines the time domain number t_id corresponding to the selected RO, and calculates the RA-RNTI based on the time domain number.

The time domain number t_id is the third slot number based on the third subcarrier spacing. The method for determining the third subcarrier is: when the subcarrier spacing of the PRACH is 15 KHz, 30 KHz, 60 KHz or 120 KHz, the third subcarrier spacing is the second Subcarrier spacing or the subcarrier spacing of the PRACH, otherwise, the third subcarrier spacing is the first subcarrier spacing (60 KHz) or the fourth subcarrier spacing (120 KHz, predefined in the protocol).

When the subcarrier spacing of the PRACH is 480 KHz, the third subcarrier spacing is 120 KHz, and t_id is the third slot number based on 120 KHz. FIG. 24 is a schematic diagram of a time domain number t_id according to an embodiment of this application.

Then, RA-RNTI can be calculated according to the following formula:

$$RA\text{-}RNTI = 1 + s\_id + 14 \times t\_id + 14 \times X \times f\_id + 14 \times X \times 8 \times ul\_carrier\_id;$$

where X=80.

In some embodiments, the time domain number is a sequence number of the first RO that is sorted in sequence in a slot set in which the RO can be sent in a transmittable frame, and the slot set in which the RO can be sent is obtained based on the first slot number group and/or the second slot number group.

It should be noted that some slots in the transmittable frame can be configured with ROs, and these slots are called the slot set in which an RO can be sent, that is, the slot set in which an RO can be sent refers to the slots that can be configured with an RO in the transmittable frame. This slot set may contain multiple transmittable ROs, and one of ROs is selected as the first RO.

The slot set in which the RO can be sent is obtained based on the first slot number group and/or the second slot number group.

In some embodiments, if the random access occasion RO time domain position group determined by the terminal includes a transmittable frame number group and a first slot number group, the slot set in which the RO can be sent is obtained based on the first slot number group.

In some embodiments, if the random access occasion RO time domain position group determined by the terminal includes a transmittable frame number group and a first slot number group, and a second slot number group, the slot set in which the RO can be sent is obtained based on the first slot number group and the second slot number group.

In some embodiments, the time domain number is a sequence number of the first RO that is sorted in sequence in a group of a slot set in which the RO can be sent in a transmittable frame, and the slot set is obtained based on the first slot number group and/or the second slot number group.

In some embodiments, the slot set is grouped according to one of the following:

R consecutive slot values are a group; or slots separated from each other by R slot values are a group.

In some embodiments, calculating the RA-RNTI of the first RO based on the time domain number includes:

calculate the RA-RNTI of the first RO based on the time domain number by using one of the following formulas:

$$RA\text{-}RNTI = 1 + s\_id + 14 \times t\_id + \qquad \text{formula 1}$$
$$14 \times X \times f\_id + 14 \times X \times 8 \times ul\_carrier\_id; \text{ or}$$
$$RA\text{-}RNTI = (1 + s\_id + 14 \times t\_id + \qquad \text{formula 2}$$
$$14 \times X \times f\_id + 14 \times X \times 8 \times ul\_carrier\_id) \bmod A;$$

where X is obtained by one of the following methods:

a size of a slot set in which an RO can be sent within a frame;

a size of a group of a slot set in which RO can be sent within a frame;

a maximum value of a size of a slot set in which an RO can be sent in a configurable frame in a RACH configuration table obtained according to at least one of the frequency range for sending a PRACH, the subcarrier spacing of the PRACH, and the frequency band characteristic for sending a PRACH; or a maximum value of a size of a group of a slot set in which an RO can be sent in a configurable frame in a RACH configuration table obtained according to at least one of the frequency range for sending a PRACH, the subcarrier spacing of the PRACH, and the frequency band characteristic for sending a PRACH;

where s_id is a first OFDM symbol index of the first RO;

t_id is a time domain number corresponding to the first RO;

f_id is a frequency domain number corresponding to the first RO;

ul_carrier_id is an uplink carrier used to transmit the preamble, 0 means a normal uplink carrier, and 1 means a supplementary uplink carrier; and A is a preset integer, or A is configured by a network side, or A is determined by the terminal.

In some embodiments, the size of the slot set in which the RO can be transmitted within a frame is a first slot set size or the first slot set size multiplied by a second slot set size.

The size of the first slot set refers to the size of the first slot set in which the RO can be sent in the transmittable frame based on the first subcarrier spacing.

The size of the second slot set refers to the size of the second slot set in which the RO can be sent in the transmittable frame based on the second subcarrier spacing.

In some embodiments, the random access method provided in the embodiment of this application further includes:

determining, by the terminal according to a size of X, whether it is necessary to determine, based on a first indication of the network, a received random access response RAR scheduled by a physical downlink control channel PDCCH, or determining, by the terminal, a size of the first indication according to a size of X.

The terminal determines the size of the first indication according to the size of X, so that the terminal obtains first indication in Downlink Control Information (DCI) carried in the Physical Downlink Control Channel (PDCCH).

In some embodiments, the first indication includes at least one of the following:

an ID of a group of the slot set in which the RO can be sent within a frame;

an ID of a group of a slot set in which an RO can be sent in a configurable frame in a RACH configuration table obtained according to at least one of the frequency range for sending a PRACH, the subcarrier spacing of the PRACH, and the frequency band characteristic for sending a PRACH; or a rounded up value of (1+s_id+14×t_id+14×X×f_id+14× X×8×ul_carrier_id)/A.

The RA-RNTI calculation method provided by the embodiment of this application will be further described below in combination with embodiments.

It is assumed that the size of the first slot set in which the RO can be sent in the transmittable frame is 40. FIG. 25 is a schematic diagram 1 of a first slot set according to an embodiment of this application.

The second slot is configured as follows:

For M2=2, as shown in FIG. 26, the second slot number group is {3, 7}; and

For M2=4, as shown in FIG. 27, the second slot number group is {2, 3, 6, 7}.

FIG. 26 is a schematic diagram 6 of a second slot number group according to an embodiment of this application. FIG. 27 is a schematic diagram 7 of a second slot number group according to an embodiment of this application.

Then, the second slot set in which the RO can be sent in the transmittable frame is the union of {3, 7} and {2, 3, 6, 7}, that is, the second slot set is {2, 3, 6, 7}. FIG. 28 is a schematic diagram 1 of the second slot set provided by the embodiment of this application.

Then, the size of the slot set in which the RO can be sent in a frame is the size of the first slot set*the size of the second slot set, that is, 40*4=160.

FIG. 29 is a schematic diagram 1 of a slot set in which an RO can be sent within a frame according to an embodiment of this application.

Then, the RA-RNTI is calculated according to the following formula:

$$RA\text{-}RNTI = 1 + s\_id + 14 \times t\_id + 14 \times X \times f\_id + 14 \times X \times 8 \times ul\_carrier\_id.$$

X=160, and in this case, the UE does not need to determine, based on the first indication of the network, whether to receive the RAR scheduled by the PDCCH.

In some embodiments, the second slot is configured as follows:

For M2=2, as shown in FIG. 30, the second slot number group is {0, 4}; and

For M2=4, as shown in FIG. 31, the second slot number group is {2, 3, 6, 7}.

FIG. 30 is a schematic diagram 8 of a second slot number group according to an embodiment of this application. FIG. 31 is a schematic diagram 9 of a second slot number group according to an embodiment of this application.

Then, the second slot set in which the RO can be sent in the transmittable frame is the union of {0, 4} and {2, 3, 6, 7}, that is, the second slot set is {0, 2, 3, 4, 6, 7}, and the size of the second slot set is 6. FIG. 32 is a schematic diagram 2 of the second slot set provided by the embodiment of this application.

Then, the size of the slot set in which the RO can be sent in a frame is the size of the first slot set*the size of the second slot set, that is, 40*6=240.

FIG. 33 is a schematic diagram 2 of a slot set in which an RO can be sent within a frame according to an embodiment of this application.

In some embodiments, it is assumed that in the RACH configuration table obtained according to at least one of the frequency range for sending a PRACH, the subcarrier spacing of the PRACH, and the frequency band characteristic for sending a PRACH, a configurable first slot set is {1, 3, 5, 7, . . . , 37, 39} with a size of 20, and a configurable second slot set is {3, 7} with a size of 2.

In this case, the configurable slot set in which the RO can be sent in a frame is shown in FIG. 34 and the size is 40. FIG. 34 is a schematic diagram 2 of a first slot set according to an embodiment of this application.

The configurable second slot set in which the RO can be sent in a frame is {3, 7}. FIG. 35 is a schematic diagram 3 of the second slot set provided by the embodiment of this application. The size of the second slot set is 2.

In this case, the configurable slot set in which the RO can be sent in a frame is shown in FIG. 36 and the size is 40. FIG. 36 is a schematic diagram 3 of a slot set in which an RO can be sent within a frame according to an embodiment of this application.

In some embodiments, FIG. 37 is a schematic diagram 4 of a slot set in which an RO can be sent within a frame according to an embodiment of this application. It is assumed that the slot set in which the RO can be sent in a frame is shown in FIG. 37 and the size is 320.

The slot set can be divided into 4 groups as follows:

FIG. 38 is a schematic diagram 1 of grouping of a slot set in which an RO can be sent within a frame according to an embodiment of this application. As shown in FIG. 38, 80 consecutive slot values are a group.

FIG. 39 is a schematic diagram 2 of grouping of a slot set in which an RO can be sent within a frame according to an embodiment of this application. As shown in FIG. 39, slots separated from each other by 4 slot values are a group.

Then, the RA-RNTI is calculated according to the following formula:

$$RA\text{-}RNTI = 1 + s\_id + 14 \times t\_id + 14 \times X \times f\_id + 14 \times X \times 8 \times ul\_carrier\_id.$$

X=80, the UE determines, based on the first indication of the network, to receive the RAR scheduled by the PDCCH, where the first indication is an ID of a group of a slot set in which an RO can be sent in a configurable frame.

In some embodiments, in the 52.6 Ghz to 71 GHz system, the subcarrier spacing of the PRACH is 960 KHz, the first subcarrier spacing is 60 KHz, and the second subcarrier spacing is 960 KHz. It is assumed that in the RACH configuration table obtained according to at least one of the frequency range for sending a PRACH, the subcarrier spacing of the PRACH, and the frequency band characteristic for sending a PRACH, a configurable first slot set is {1, 2, 3, 4, . . . , 38, 39} with a size of 40. FIG. 40 is a schematic diagram 3 of a first slot set according to an embodiment of this application. The configurable second slot set in which the RO can be sent in the transmittable frame is {4, 5, 6, 7, 12, 13, 14, 15}. FIG. 41 is a schematic diagram 4 of the second slot set provided by the embodiment of this application. As shown in FIG. 41, the size of the second slot set is 8.

In this case, the configurable slot set in which the RO can be sent in a frame is shown in FIG. 42 and the size is 320.

FIG. 42 is a schematic diagram 5 of a slot set in which an RO can be sent within a frame according to an embodiment of this application.

The slot set can be divided into 4 groups as follows:

FIG. 43 is a schematic diagram 3 of grouping of a slot set in which an RO can be sent within a frame according to an embodiment of this application. As shown in FIG. 43, 80 consecutive slot values are a group.

FIG. 44 is a schematic diagram 4 of grouping of a slot set in which an RO can be sent within a frame according to an embodiment of this application. As shown in FIG. 44, slots separated from each other by 4 slot values are a group.

The RA-RNTI is calculated according to the following formula:

$$RA\text{-}RNTI = 1 + s\_id + 14 \times t\_id + 14 \times X \times f\_id + 14 \times X \times 8 \times ul\_carrier\_id.$$

X=80, the UE determines, based on the first indication of the network, to receive the RAR scheduled by the PDCCH, where the first indication is an ID of a group of a slot set in which an RO can be sent in a configurable frame in a RACH configuration table obtained according to at least one of the frequency range for sending a PRACH, the subcarrier spacing of the PRACH, and the frequency band characteristic for sending a PRACH.

The random access method provided by the embodiment of this application implements the configuration of RO time frequency resources when the subcarrier spacing of the PRACH is greater than 120 kHz, and also proposes a corresponding RA-RNTI calculation method for RO time domain resource configuration design of a high PRACH SCS, which can avoid data overflow and improve the random access performance of terminals.

It should be noted that an execution subject of the random access method provided in this embodiment of this application may be a random access apparatus, or a control module configured to execute the random access method in the random access apparatus. In this embodiment of this application, the random access apparatus provided in this embodiment of this application is described by using an example in which the random access method is implemented by the random access apparatus.

FIG. 45 is a schematic structural diagram of a random access apparatus according to an embodiment of this application. As shown in FIG. 45, the apparatus includes:

a determining unit 4510, configured to determine a random access occasion RO time domain position group; and a calculation unit 4520, configured to select a first RO from the RO time domain position group, and calculate a random access radio network temporary identifier RA-RNTI of the first RO;

where the RO time domain position group includes at least one of the following:

a transmittable frame number group and a first slot number group, and a second slot number group;

where the transmittable frame number group is used to indicate a transmittable frame, and the transmittable frame is a radio frame where an RO that can be used to transmit a preamble is located;

the first slot number group is used to indicate a first slot that is based on a first subcarrier spacing and in which the RO is located in the transmittable frame; and the second slot number group is used to indicate a second slot that is based on a second subcarrier spacing and in which the RO is located in the first slot.

In the embodiments of this application, the terminal determines the random access timing RO time domain position group, where the RO time domain position group includes at least one of the following: a transmittable frame number group and a first slot number group; and a second slot number group, and then the terminal selects an RO from the RO time domain position group, and calculates the random access radio network temporary identifier RA-RNTI of the RO, which can configure RO time-frequency resources when the subcarrier spacing of the PRACH supported by the system is greater than 120 kHz.

In some embodiments, the first subcarrier spacing or the second subcarrier spacing is related to at least one of the following:

a subcarrier spacing for sending a PRACH;

a frequency range for sending a PRACH;

a format for sending a PRACH; or a sequence length for sending a PRACH.

In some embodiments, the first slot number group is related to at least one of the following:

a subcarrier spacing for sending a PRACH;

a frequency range for sending a PRACH;

a frequency band characteristic for sending a PRACH;

a format for sending a PRACH; or a sequence length for sending a PRACH;

a PRACH configuration index;

the first subcarrier spacing;

a number L of slots that are based on the first subcarrier spacing and that are contained in each radio frame;

a size M1 of the first slot number group; and a configuration index of the first slot number group.

In some embodiments, the second slot number group is related to at least one of the following:

a subcarrier spacing for sending a PRACH;

a frequency range for sending a PRACH;

a frequency band characteristic for sending a PRACH;

a format for sending a PRACH; and a sequence length for sending a PRACH;

a PRACH configuration index;

the first subcarrier spacing;

the second subcarrier spacing;

a number L of slots that are based on the first subcarrier spacing and that are contained in each radio frame;

a ratio N of the second subcarrier spacing to the first subcarrier spacing;

a size M1 of the first slot number group; and a size M2 of the second slot number group;

a configuration index of the first slot number group; and a configuration index of the second slot number group.

In some embodiments, the determining unit is configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group and a size M1 of the first slot number group in which the RO is located; and determine that the first slot number group is M1 values predefined between 0 and L−1;

where L is a number of slots that are based on the first subcarrier spacing and that are contained in each radio frame; and the M1 values of the first slot number group are one or more combinations of M1 values obtained from 0 to L−1.

In some embodiments, the determining unit is configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group, the first slot number group, and a size M2 of the second slot number group in which the RO is located; and determine that the second slot number group is M2 values predefined between 0 and N−1;

N is a ratio of the second subcarrier spacing to the first subcarrier spacing; and the M2 values of the second slot number group are one or more combinations of M2 values obtained from 0 to N−1.

In some embodiments, the determining unit is configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group and a size M1 of the first slot number group in which the RO is located, and a configuration index k1 of the first slot number group; and determine that the first slot number group is M1 values predefined between 0 and L−1 according to the configuration index k1 of the first slot number group;

where L is a number of slots that are based on the first subcarrier spacing and that are contained in each radio frame; and the configuration index k1 of the first slot number group is used to indicate M1 values of the first slot number group; and the M1 values of the first slot number group are one or more combinations of M1 values obtained from 0 to L−1.

In some embodiments, the determining unit is configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group, the first slot number group, and a size M2 of the second slot number group in which the RO is located, and a configuration index k2 of the second slot number group; and determine that the second slot number group is M2 values predefined between 0 and N−1 according to the configuration index k2 of the second slot number group;

where N is a ratio of the second subcarrier spacing to the first subcarrier spacing;

the configuration index k2 of the second slot number group is used to indicate M2 values of the second slot number group; and the M2 values of the second slot number group are one or more combinations of M2 values obtained from 0 to N−1.

In some embodiments, that the M1 values of the first slot number group are one or more combinations of M1 values obtained from 0 to L−1 includes one or more of the following:

the first M1 values from 0 to L−1;

the last M1 values from 0 to L−1;

all or a part of X satisfying X mod (rounded up or rounded down value of L/M1)=Y, where X is an integer value between 0 and L−1, and Y is one or more predefined values;

M1 consecutive values between 0 and L−1; and multiple M1 consecutive values between 0 and L−1.

In some embodiments, that the M2 values of the second slot number group are one or more combinations of M2 values obtained from 0 to N−1 includes one or more of the following:

the first M2 values from 0 to N−1;

the last M2 values from 0 to N−1;

all or a part of X satisfying X mod (rounded up or rounded down value of N/M2)=Y, where X is an integer value between 0 and N−1, and Y is one or more predefined values;

M2 consecutive values between 0 and N−1; and multiple M2 consecutive values between 0 and N−1.

In some embodiments, the calculation unit includes:

a time domain number determination subunit, configured to determine a time domain number corresponding to the first RO; and a calculation subunit, configured to calculate a RA-RNTI of the first RO based on the time domain number.

In some embodiments, the time domain number is a third slot number based on a third subcarrier spacing, where the third subcarrier spacing is determined by one of the following:

the third subcarrier spacing is the first subcarrier spacing;

the third subcarrier spacing is the second subcarrier spacing or the subcarrier spacing of the PRACH; and in a case that the subcarrier spacing of the PRACH satisfies a first condition or belongs to a first set, the third subcarrier spacing is the second subcarrier spacing or the subcarrier spacing of the PRACH; otherwise, the third subcarrier spacing is the first subcarrier spacing or the fourth subcarrier spacing, where the fourth subcarrier spacing is a predefined subcarrier spacing.

In some embodiments, the time domain number is a sequence number of the first RO that is sorted in sequence in a slot set in which the RO can be sent in a transmittable frame, and the slot set in which the RO can be sent is obtained based on the first slot number group and/or the second slot number group.

In some embodiments, the time domain number is a sequence number of the first RO that is sorted in sequence in a group of a slot set in which the RO can be sent in a transmittable frame, and the slot set is obtained based on the first slot number group and/or the second slot number group.

In some embodiments, the slot set is grouped according to one of the following:

R consecutive slot values are a group; and slots separated from each other by R slot values are a group.

In some embodiments, the calculation subunit is configured to:

calculate the RA-RNTI of the first RO based on the time domain number by using one of the following formulas:

$$RA\text{-}RNTI = 1 + s\_id + 14 \times t\_id + \qquad \text{formula 1}$$
$$14 \times X \times f\_id + 14 \times X \times 8 \times ul\_carrier\_id; \text{and}$$

$$RA\text{-}RNTI = (1 + s\_id + 14 \times t\_id + \qquad \text{formula 2;}$$
$$14 \times X \times f\_id + 14 \times X \times 8 \times ul\_carrier\_id)\bmod A$$

where X is obtained by one of the following methods:

a size of a slot set in which an RO can be sent within a frame;

a size of a group of a slot set in which RO can be sent within a frame;

a maximum value of a size of a slot set in which an RO can be sent in a configurable frame in a RACH configuration table obtained according to at least one of the frequency range for sending a PRACH, the subcarrier spacing of the PRACH, and the frequency band characteristic for sending a PRACH; and a maximum value of a size of a group of a slot set in which an RO can be sent in a configurable frame in a RACH configuration table obtained according to at least one of the frequency range for sending a PRACH, the subcarrier spacing of the PRACH, and the frequency band characteristic for sending a PRACH;

where s_id is a first OFDM symbol index of the first RO;

t_id is a time domain number corresponding to the first RO;

f_id is a frequency domain number corresponding to the first RO;

ul_carrier_id is an uplink carrier used to transmit the preamble, 0 means a normal uplink carrier, and 1 means a supplementary uplink carrier; and A is a preset integer, or A is configured by a network side, or A is determined by the terminal.

In some embodiments, the size of the slot set in which the RO can be transmitted within a frame is a first slot set size or the first slot set size multiplied by a second slot set size.

In some embodiments, the following is further included:

a determination unit, configured to determine, by the terminal according to a size of X, whether it is necessary to determine, based on a first indication of the network, a received random access response RAR scheduled by a physical downlink control channel PDCCH, or determining, by the terminal, a size of the first indication according to a size of X.

In some embodiments, the first indication includes at least one of the following:

an ID of a group of the slot set in which the RO can be sent within a frame;

an ID of a group of a slot set in which an RO can be sent in a configurable frame in a RACH configuration table obtained according to at least one of the frequency range for sending a PRACH, the subcarrier spacing of the PRACH, and the frequency band characteristic for sending a PRACH; and a rounded up value of $(1+s\_id+14\times t\_id+14\times X\times f\_id+14\times X\times 8\times ul\_carrier\_id)/A$.

The random access apparatus provided by the embodiment of this application implements the configuration of RO time frequency resources when the subcarrier spacing of the PRACH is greater than 120 kHz, and also proposes a corresponding RA-RNTI calculation method for RO time domain resource configuration design of a high PRACH SCS, which can avoid data overflow and improve the random access performance of terminals.

The random access in this embodiment of this application may be a device or an electronic device with an operating system, or may be a component, an integrated circuit, or a chip in a terminal. The electronic device may be a mobile electronic device, or may be a non-mobile electronic device. Exemplarily, mobile electronic devices may include, but are not limited to, the types of terminals 11 listed above, and non-mobile electronic devices may be servers, Network Attached Storage (NAS), personal computers (PCs), televisions (TV), teller machines or self-service machines, etc., which are not specifically limited in this embodiment of this application.

The random access apparatus according to an embodiments of the present disclosure can implement the processes in the method embodiments in FIG. 3 to FIG. 44, and achieve the same technical effect. To avoid duplication, details are not described herein again.

As shown in FIG. 46, an embodiment of this application further provides a communications device 4600, including a processor 4601, a memory 4602, and a program or an instruction stored in the memory 4602 and executable on the processor 4601. For example, when the communications device 4600 is a terminal, when the program or instruction is executed by the processor 4601, each process of the embodiment of the foregoing random access method is performed, and the same technical effect can be achieved. When the communications device 4600 is a network side device, when the programs or instructions are executed by the processor 4601, each process of the above embodiment of the random access method is performed, and the same technical effect can be achieved. To avoid repetition, details are not repeated herein.

FIG. 47 is a schematic diagram of a hardware structure of a terminal according to an embodiment of this application.

A terminal 4700 includes but is not limited to at least a part of components such as a radio frequency unit 4701, a network module 4702, an audio output unit 4703, an input unit 4704, a sensor 4705, a display unit 4706, a user input unit 4707, an interface unit 4708, a memory 4709, and a processor 4710.

A person skilled in the art can understand that the terminal 4700 may further include a power supply (such as a battery) that supplies power to each component. The power supply may be logically connected to the processor 4710 by using a power supply management system, to implement functions such as charging and discharging management, and power consumption management by using the power supply management system. The terminal structure shown in FIG. 47 constitutes no limitation on the terminal, and the terminal may include more or fewer components than those shown in the figure, or combine some components, or have different component arrangements. Details are not described herein.

It should be understood that, in this embodiment of this application, the input unit 4704 may include a Graphics Processing Unit (GPU) 47041 and a microphone 47042, and the graphics processing unit 47041 processes image data of a still picture or a video obtained by an image capture apparatus (for example, a camera) in a video capture mode or an image capture mode. The display unit 4706 may include a display panel 47061. In some embodiments, the display panel 47061 may be configured in a form such as a liquid crystal display or an organic light-emitting diode. The user input unit 4707 includes a touch panel 47071 and another input device 47072. The touch panel 47071 is also referred to as a touchscreen. The touch panel 47071 may include two parts: a touch detection apparatus and a touch controller. The another input device 47072 may include but is not limited to a physical keyboard, a functional button (such as a volume control button or a power on/off button), a trackball, a mouse, and a joystick. Details are not described herein.

In this embodiment of this application, the radio frequency unit 4701 receives downlink data from a network side device and then sends the downlink data to the processor 4710 for processing; and sends uplink data to the network side device. Usually, the radio frequency unit 4701 includes but is not limited to an antenna, at least one amplifier, a transceiver, a coupler, a low noise amplifier, a duplexer, and the like.

The memory 4709 may be configured to store a software program or an instruction and various data. The memory 4709 may mainly include a storage program or instruction area and a storage data area, where the storage program or instruction area may store an operating system, an application program or an instruction required by at least one function (such as a sound play function or an image play function), and the like. In addition, the memory 4709 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 4710 may include one or more processing units. In some embodiments, an application processor and a modem processor may be integrated into the processor 4710. The application processor mainly processes an operating system, a user interface, an application, an instruction, or the like. The modem processor mainly processes wireless communications, for example, a baseband processor. It can be understood that, the modem processor may not be integrated into the processor 4710.

The processor 4710 is configured to:

determine a random access occasion RO time domain position group; and select a first RO from the RO time domain position group, and calculating a random access radio network temporary identifier RA-RNTI of the first RO;

where the RO time domain position group includes at least one of the following:

a transmittable frame number group and a first slot number group, and a second slot number group;

where the transmittable frame number group is used to indicate a transmittable frame, and the transmittable frame is a radio frame where an RO that can be used to transmit a preamble is located;

the first slot number group is used to indicate a first slot that is based on a first subcarrier spacing and in which the RO is located in the transmittable frame; and the second slot number group is used to indicate a second slot that is based on a second subcarrier spacing and in which the RO is located in the first slot.

In the embodiments of this application, the terminal determines the random access timing RO time domain position group, where the RO time domain position group includes at least one of the following: a transmittable frame number group and a first slot number group; and a second slot number group, and then the terminal selects an RO from the RO time domain position group, and calculates the random access radio network temporary identifier RA-RNTI of the RO, which can configure RO time-frequency resources when the subcarrier spacing of the PRACH supported by the system is greater than 120 kHz.

In some embodiments, the first subcarrier spacing or the second subcarrier spacing is related to at least one of the following:

a subcarrier spacing for sending a PRACH;
a frequency range for sending a PRACH;
a format for sending a PRACH; and
a sequence length for sending a PRACH.

In some embodiments, the first slot number group is related to at least one of the following:

a subcarrier spacing for sending a PRACH;
a frequency range for sending a PRACH;
a frequency band characteristic for sending a PRACH;
a format for sending a PRACH; and
a sequence length for sending a PRACH;
a PRACH configuration index;
the first subcarrier spacing;
a number L of slots that are based on the first subcarrier spacing and that are contained in each radio frame;
a size M1 of the first slot number group; and
a configuration index of the first slot number group.

In some embodiments, the second slot number group is related to at least one of the following:

a subcarrier spacing for sending a PRACH;
a frequency range for sending a PRACH;
a frequency band characteristic for sending a PRACH;
a format for sending a PRACH; and
a sequence length for sending a PRACH;
a PRACH configuration index;
the first subcarrier spacing;
the second subcarrier spacing;
a number L of slots that are based on the first subcarrier spacing and that are contained in each radio frame;
a ratio N of the second subcarrier spacing to the first subcarrier spacing;
a size M1 of the first slot number group; and
a size M2 of the second slot number group;
a configuration index of the first slot number group; and
a configuration index of the second slot number group.

In some embodiments, the processor 4710 is further configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group and a size M1 of the first slot number group in which the RO is located; and determine that the first slot number group is M1 values predefined between 0 and L−1;

where L is a number of slots that are based on the first subcarrier spacing and that are contained in each radio frame; and the M1 values of the first slot number group are one or more combinations of M1 values obtained from 0 to L−1.

In some embodiments, the processor 4710 is further configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group, the first slot number group, and a size M2 of the second slot number group in which the RO is located; and determine that the second slot number group is M2 values predefined between 0 and N−1;

N is a ratio of the second subcarrier spacing to the first subcarrier spacing; and the M2 values of the second slot number group are one or more combinations of M2 values obtained from 0 to N−1.

In some embodiments, the processor 4710 is further configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group and a size M1 of the first slot number group in which the RO is located, and a configuration index k1 of the first slot number group; and determine that the first slot number group is M1 values predefined between 0 and L−1 according to the configuration index k1 of the first slot number group;

where L is a number of slots that are based on the first subcarrier spacing and that are contained in each radio frame; and the configuration index k1 of the first slot number group is used to indicate M1 values of the first slot number group; and the M1 values of the first slot number group are one or more combinations of M1 values obtained from 0 to L−1.

In some embodiments, the processor 4710 is further configured to:

obtain a random access channel RACH configuration table according to at least one of the frequency range for sending a physical random access channel PRACH, the subcarrier spacing of the PRACH, and the frequency band characteristic for sending a PRACH;

search the RACH configuration table according to a PRACH configuration index indicated by a network, to obtain the transmittable frame number group, the first slot number group, and a size M2 of the second slot number group in which the RO is located, and a configuration index k2 of the second slot number group; and determine that the second slot number group is M2 values predefined between 0 and N−1 according to the configuration index k2 of the second slot number group;

where N is a ratio of the second subcarrier spacing to the first subcarrier spacing;

the configuration index k2 of the second slot number group is used to indicate M2 values of the second slot number group; and the M2 values of the second slot number group are one or more combinations of M2 values obtained from 0 to N−1.

In some embodiments, that the M1 values of the first slot number group are one or more combinations of M1 values obtained from 0 to L−1 includes one or more of the following:

the first M1 values from 0 to L−1;

the last M1 values from 0 to L−1;

all or a part of X satisfying X mod (rounded up or rounded down value of L/M1)=Y, where X is an integer value between 0 and L−1, and Y is one or more predefined values;

M1 consecutive values between 0 and L−1; and multiple M1 consecutive values between 0 and L−1.

In some embodiments, that the M2 values of the second slot number group are one or more combinations of M2 values obtained from 0 to N−1 includes one or more of the following:

the first M2 values from 0 to N−1;

the last M2 values from 0 to N−1;

all or a part of X satisfying X mod (rounded up or rounded down value of N/M2)=Y, where X is an integer value between 0 and N−1, and Y is one or more predefined values;

M2 consecutive values between 0 and N−1; and multiple M2 consecutive values between 0 and N−1.

In some embodiments, the processor 110 is further configured to:

determine a time domain number corresponding to the first RO; and calculate a RA-RNTI of the first RO based on the time domain number.

In some embodiments, the time domain number is a third slot number based on a third subcarrier spacing, where the third subcarrier spacing is determined by one of the following:

the third subcarrier spacing is the first subcarrier spacing;

the third subcarrier spacing is the second subcarrier spacing or the subcarrier spacing of the PRACH; and in a case that the subcarrier spacing of the PRACH satisfies a first condition or belongs to a first set, the third subcarrier spacing is the second subcarrier spacing or the subcarrier spacing of the PRACH; otherwise, the third subcarrier spacing is the first subcarrier spacing or the fourth subcarrier spacing, where the fourth subcarrier spacing is a predefined subcarrier spacing.

In some embodiments, the time domain number is a sequence number of the first RO that is sorted in sequence in a slot set in which the RO can be sent in a transmittable frame, and the slot set in which the RO can be sent is obtained based on the first slot number group and/or the second slot number group.

In some embodiments, the time domain number is a sequence number of the first RO that is sorted in sequence in a group of a slot set in which the RO can be sent in a transmittable frame, and the slot set is obtained based on the first slot number group and/or the second slot number group.

In some embodiments, the slot set is grouped according to one of the following:

R consecutive slot values are a group; and slots separated from each other by R slot values are a group.

In some embodiments, the processor 4710 is further configured to:

calculate the RA-RNTI of the first RO based on the time domain number by using one of the following formulas:

$$RA\text{-}RNTI = 1 + s\_id + 14 \times t\_id + \qquad \text{formula 1}$$
$$14 \times X \times f\_id + 14 \times X \times 8 \times ul\_carrier\_id; \text{ and}$$

$$RA\text{-}RNTI = \qquad \text{formula 2}$$
$$(1 + s\_id + 14 \times t\_id + 14 \times X \times f\_id + 14 \times X \times 8 \times ul\_carrier\_id)$$
$$\text{mod } A;$$

where X is obtained by one of the following methods:

a size of a slot set in which an RO can be sent within a frame;

a size of a group of a slot set in which RO can be sent within a frame;

a maximum value of a size of a slot set in which an RO can be sent in a configurable frame in a RACH configuration table obtained according to at least one of the frequency range for sending a PRACH, the subcarrier spacing of the PRACH, and the frequency band characteristic for sending a PRACH; and a maximum value of a size of a group of a slot set in which an RO can be sent in a configurable frame in a RACH configuration table obtained according to at least one of the frequency range for sending a PRACH, the subcarrier spacing of the PRACH, and the frequency band characteristic for sending a PRACH;

where s_id is a first OFDM symbol index of the first RO;

t_id is a time domain number corresponding to the first RO;

f_id is a frequency domain number corresponding to the first RO;

ul_carrier_id is an uplink carrier used to transmit the preamble, 0 means a normal uplink carrier, and 1 means a supplementary uplink carrier; and A is a preset integer, or A is configured by a network side, or A is determined by the terminal.

In some embodiments, the size of the slot set in which the RO can be transmitted within a frame is a first slot set size or the first slot set size multiplied by a second slot set size.

In some embodiments, the processor 4710 is further configured to:

determine, by the terminal according to a size of X, whether it is necessary to determine, based on a first indication of the network, a received random access response RAR scheduled by a physical downlink control channel PDCCH, or determining, by the terminal, a size of the first indication according to a size of X.

In some embodiments, the first indication includes at least one of the following:

an ID of a group of the slot set in which the RO can be sent within a frame;

an ID of a group of a slot set in which an RO can be sent in a configurable frame in a RACH configuration table obtained according to at least one of the frequency range for sending a PRACH, the subcarrier spacing of the PRACH, and the frequency band characteristic for sending a PRACH; and a rounded up value of $(1+s\_id+14\times t\_id+14\times X\times f\_id+14\times X\times 8\times ul\_carrier\_id)/A$.

The terminal provided by the embodiment of this application implements the configuration of RO time frequency resources when the subcarrier spacing of the PRACH is greater than 120 kHz, and also proposes a corresponding RA-RNTI calculation method for RO time domain resource configuration design of a high PRACH SCS, which can avoid data overflow and improve the random access performance of terminals.

The terminal embodiment in the embodiment of this application is a product embodiment corresponding to the above-mentioned method embodiment. All the implementation methods in the above-mentioned method embodiment are applicable to this terminal embodiment, and can also achieve the same or similar technical effects. Therefore, this will not be repeated here.

An embodiment of this application further provides a readable storage medium, where the readable storage medium stores a program or an instruction, and when the program or the instruction is executed by a processor, the processes of the foregoing random access method embodiment are implemented, and a same technical effect can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip, the chip includes a processor and a communications interface, the communications interface is coupled to the processor, and the processor is configured to run programs or instructions to implement each process of the embodiment of the foregoing random access method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus may also be included. An element limited by "includes a . . . " does not, without more constraints, preclude the presence of additional identical elements in the process, method, article, or apparatus that includes the element. In addition, it should be pointed out that the scope of the methods and devices in the embodiments of this application is not limited to performing functions in the order shown or discussed, and may also include performing functions in a substantially simultaneous manner or in a reverse order according to the functions involved, for example, the described methods may be performed in an order different from that described, and various steps may also be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as an ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A random access method, comprising:

determining, by a terminal, a random access occasion (RO) time domain position group; and selecting a first RO from the RO time domain position group, and calculating a random access radio network temporary identifier (RA-RNTI) of the first RO, wherein the RO time domain position group comprises at least one of the following:

a transmittable frame number group and a first slot number group, and a second slot number group, wherein the transmittable frame number group is used to indicate a transmittable frame, and the transmittable frame is a radio frame wherein an RO that is used to transmit a preamble is located;

the first slot number group is used to indicate a first slot that is based on a first subcarrier spacing and in which the RO is located in the transmittable frame; and the second slot number group is used to indicate a second slot that is based on a second subcarrier spacing and in which the RO is located in the first slot, wherein the determining, by the terminal, the random access occasion (RO) time domain position group comprises:

obtaining a random access channel (RACH) configuration table according to at least one of the frequency range for sending a physical random access channel (PRACH), the subcarrier spacing of the PRACH, and the frequency band characteristic for sending a PRACH;

searching the RACH configuration table according to a PRACH configuration index indicated by a network, to obtain the transmittable frame number group, the first slot number group, and a size M2 of the second slot number group in which the RO is located; and determining that the second slot number group is M2 values predefined between 0 and N−1, wherein N is a ratio of the second subcarrier spacing to the first subcarrier spacing; and the M2 values of the second slot number group are one or more combinations of M2 values obtained from 0 to N−1.

2. The random access method according to claim 1, wherein the first subcarrier spacing or the second subcarrier spacing is related to at least one of the following:

a subcarrier spacing for sending a physical random access channel (PRACH);

a frequency range for sending a PRACH;

a format for sending a PRACH; or a sequence length for sending a PRACH.

3. The random access method according to claim 1, wherein the first slot number group is related to at least one of the following:

a subcarrier spacing for sending a PRACH;

a frequency range for sending a PRACH;

a frequency band characteristic for sending a PRACH;

a format for sending a PRACH;

a sequence length for sending a PRACH;

a PRACH configuration index;

the first subcarrier spacing;

a number L of slots that are based on the first subcarrier spacing and that are contained in each radio frame;

a size M1 of the first slot number group; or a configuration index of the first slot number group.

4. The random access method according to claim 1, wherein the second slot number group is related to at least one of the following:

a subcarrier spacing for sending a PRACH; or a size M2 of the second slot number group.

5. The random access method according to claim 1, wherein that the M2 values of the second slot number group are one or more combinations of M2 values obtained from 0 to N−1 comprises one or more of the following: the first M2 values from 0 to N−1; the last M2 values from 0 to N−1; all or a part of X satisfying X mod (rounded up or rounded down value of N/M2)=Y, wherein X is an integer value between 0 and N−1, and Y is one or more predefined values; M2 consecutive values between 0 and N−1; or multiple M2 consecutive values between 0 and N−1.

6. The random access method according to claim 1, wherein the calculating the random access radio network temporary identifier (RA-RNTI) of the first RO comprises:

determining a time domain number corresponding to the first RO; and calculating a RA-RNTI of the first RO based on the time domain number.

7. The random access method according to claim 6, wherein the time domain number is a third slot number based on a third subcarrier spacing, wherein the third subcarrier spacing is determined by one of the following:

when the subcarrier spacing of the PRACH belongs to a first set, the third subcarrier spacing is the subcarrier spacing of the PRACH; otherwise, the third subcarrier spacing is the fourth subcarrier spacing, wherein the fourth subcarrier spacing is a predefined subcarrier spacing.

8. The random access method according to claim 6, wherein the calculating the RA-RNTI of the first RO based on the time domain number comprises:

calculating the RA-RNTI of the first RO based on the time domain number by using one of the following formulas:

$$RA\text{-}RNTI = \qquad \text{formula 1}$$

$$1 + s\_id + 14 \times t\_id + 14 \times X \times f\_id + 14 \times X \times 8 \times ul\_carrier\_id$$

wherein X is obtained by the following method:

a size of a slot set in which an RO is sent within a frame wherein s_id is a first OFDM symbol index of the first RO;

t_id is a time domain number corresponding to the first RO;

f_id is a frequency domain number corresponding to the first RO; and ul_carrier_id is an uplink carrier used to transmit the preamble, 0 means a normal uplink carrier, and 1 means a supplementary uplink carrier.

9. The random access method according to claim 8, wherein the size of the slot set in which the RO is transmitted within a frame is the first slot set size multiplied by a second slot set size.

10. The random access method according to claim 8, further comprising:

determining, by the terminal according to a size of X, whether it is necessary to determine, based on a first indication of the network, a received random access response (RAR) scheduled by a physical downlink control channel (PDCCH), or determining, by the terminal, a size of the first indication according to a size of X.

11. The random access method according to claim 10, wherein the first indication comprises at least one of the following:

an ID of a group of the slot set in which the RO is sent within a frame;

an ID of a group of a slot set in which an RO is sent in a configurable frame in a RACH configuration table obtained according to at least one of the frequency range for sending a PRACH, the subcarrier spacing of the PRACH, and the frequency band characteristic for sending a PRACH; or a rounded up value of $(1+s\_id+14 \times t\_id+14 \times X \times f\_id+14 \times X \times 8 \times ul\_carrier\_id)/A$.

12. A terminal, comprising:

a memory storing a computer program; and a processor coupled to the memory and configured to execute the computer program to perform operations comprising:

determining a random access occasion (RO) time domain position group; and selecting a first RO from the RO time domain position group, and calculating a random access radio network temporary identifier (RA-RNTI) of the first RO, wherein the RO time domain position group comprises at least one of the following:

a transmittable frame number group and a first slot number group, and a second slot number group, wherein the transmittable frame number group is used to indicate a transmittable frame, and the transmittable frame is a radio frame wherein an RO that is used to transmit a preamble is located;

the first slot number group is used to indicate a first slot that is based on a first subcarrier spacing and in which the RO is located in the transmittable frame; and the second slot number group is used to indicate a second slot that is based on a second subcarrier spacing and in which the RO is located in the first slot, wherein the determining the random access occasion (RO) time domain position group comprises:

obtaining a random access channel (RACH) configuration table according to at least one of the frequency range for sending a physical random access channel (PRACH), the subcarrier spacing of the PRACH, and the frequency band characteristic for sending a PRACH;

searching the RACH configuration table according to a PRACH configuration index indicated by a network, to obtain the transmittable frame number group, the first slot number group, and a size M2 of the second slot number group in which the RO is located; and determining that the second slot number group is M2 values predefined between 0 and N−1, wherein N is a ratio of the second subcarrier spacing to the first subcarrier spacing; and the M2 values of the second slot number group are one or more combinations of M2 values obtained from 0 to N−1.

13. The terminal according to claim 12, wherein the second slot number group is related to at least one of the following:

a subcarrier spacing for sending a PRACH; or a size M2 of the second slot number group.

14. The terminal according to claim 12, wherein the calculating the random access radio network temporary identifier (RA-RNTI) of the first RO comprises:

determining a time domain number corresponding to the first RO; and calculating a RA-RNTI of the first RO based on the time domain number.

15. The terminal according to claim 14, wherein the time domain number is a third slot number based on a third subcarrier spacing, wherein the third subcarrier spacing is determined by one of the following:

when the subcarrier spacing of the PRACH belongs to a first set, the third subcarrier spacing is the subcarrier spacing of the PRACH; otherwise, the third subcarrier spacing is the fourth subcarrier spacing, wherein the fourth subcarrier spacing is a predefined subcarrier spacing.

16. The terminal according to claim 14, wherein the calculating the RA-RNTI of the first RO based on the time domain number comprises:

calculating the RA-RNTI of the first RO based on the time domain number by using one of the following formulas:

$$RA\text{-}RNTI = \qquad\qquad\qquad\qquad \text{formula 1}$$

$$1 + s\_id + 14 \times t\_id + 14 \times X \times f\_id + 14 \times X \times 8 \times ul\_carrier\_id$$

wherein X is obtained by the following method:

a size of a slot set in which an RO is sent within a frame wherein s_id is a first OFDM symbol index of the first RO;

t_id is a time domain number corresponding to the first RO;

f_id is a frequency domain number corresponding to the first RO; and ul_carrier_id is an uplink carrier used to transmit the preamble, 0 means a normal uplink carrier, and 1 means a supplementary uplink carrier.

17. A non-transitory computer-readable storage medium, storing a computer program, wherein the computer program, when executed by a processor of a terminal, causes the processor to perform operations comprising:

determining a random access occasion (RO) time domain position group; and selecting a first RO from the RO time domain position group, and calculating a random access radio network temporary identifier (RA-RNTI) of the first RO, wherein the RO time domain position group comprises at least one of the following:

a transmittable frame number group and a first slot number group, and a second slot number group, wherein the transmittable frame number group is used to indicate a transmittable frame, and the transmittable frame is a radio frame wherein an RO that is used to transmit a preamble is located;

the first slot number group is used to indicate a first slot that is based on a first subcarrier spacing and in which the RO is located in the transmittable frame; and the second slot number group is used to indicate a second slot that is based on a second subcarrier spacing and in which the RO is located in the first slot, wherein the determining the random access occasion (RO) time domain position group comprises:

obtaining a random access channel (RACH) configuration table according to at least one of the frequency range for sending a physical random access channel (PRACH), the subcarrier spacing of the PRACH, and the frequency band characteristic for sending a PRACH;

searching the RACH configuration table according to a PRACH configuration index indicated by a network, to obtain the transmittable frame number group, the first slot number group, and a size M2 of the second slot number group in which the RO is located; and determining that the second slot number group is M2 values predefined between 0 and N−1, wherein N is a ratio of the second subcarrier spacing to the first subcarrier spacing; and the M2 values of the second slot number group are one or more combinations of M2 values obtained from 0 to N−1.

18. The random access method according to claim 7, wherein when the subcarrier spacing of the PRACH is 15 KHz, 30 KHz, or 120 KHz, the third subcarrier spacing is the subcarrier spacing of the PRACH; otherwise, the third subcarrier spacing is 120 KHz.

19. The terminal according to claim 15, wherein when the subcarrier spacing of the PRACH is 15 KHz, 30 KHz, or 120 KHz, the third subcarrier spacing is the subcarrier spacing of the PRACH; otherwise, the third subcarrier spacing is 120 KHz.

20. The terminal according to claim 12, wherein the first slot number group is related to at least one of the following:

a subcarrier spacing for sending a PRACH;

a frequency range for sending a PRACH;

a frequency band characteristic for sending a PRACH;

a format for sending a PRACH;

a sequence length for sending a PRACH;

a PRACH configuration index;

the first subcarrier spacing;

a number L of slots that are based on the first subcarrier
 spacing and that are contained in each radio frame;
a size M1 of the first slot number group; or
a configuration index of the first slot number group.

* * * * *